(12) United States Patent
Katakura et al.

(10) Patent No.: US 6,678,126 B2
(45) Date of Patent: Jan. 13, 2004

(54) MAGNETORESISTANCE-EFFECT MAGNETIC HEAD

(75) Inventors: Toru Katakura, Miyagi (JP); Takuji Matsuo, Miyagi (JP); Eiji Nakashio, Miyagi (JP); Junichi Sugawara, Miyagi (JP); Seiji Onoe, Miyagi (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 10/046,501

(22) Filed: Oct. 19, 2001

(65) Prior Publication Data

US 2002/0114110 A1 Aug. 22, 2002

(51) Int. Cl.⁷ .................................................. G11B 5/39

(52) U.S. Cl. ....................................... 360/321; 360/319

(58) Field of Search ............................... 360/321, 324, 360/319; 29/603.01, 603.14, 603.15, 603.07

(56) References Cited

U.S. PATENT DOCUMENTS

| | | | | |
|---|---|---|---|---|
| 5,258,883 A | * | 11/1993 | Ruigrok | 360/321 |
| 5,793,579 A | * | 8/1998 | Yamamoto et al. | 360/126 |
| 5,909,344 A | * | 6/1999 | Gill | 360/321 |
| 6,266,217 B1 | * | 7/2001 | Ruigrok et al. | 360/320 |
| 6,493,193 B2 | * | 12/2002 | Honma et al. | 360/313 |
| 6,510,030 B1 | * | 1/2003 | Song et al. | 360/319 |
| 6,542,340 B1 | * | 4/2003 | Hayashi | 360/322 |

* cited by examiner

*Primary Examiner*—Brian E. Miller
(74) *Attorney, Agent, or Firm*—Sonnenschein, Nath & Rosenthal LLP

(57) ABSTRACT

The part of an MR element 25 which lies close to a medium-facing surface 10a overlaps that part of a flux-guiding element 24 which lies remote from the medium-facing surface 10a, with a second gap film 23b interposed between the elements 24 and 25. Further, the MR element 25 overlaps the flux-guiding element 24 for a distance that falls within a range of 15 to 25% of the length of the MR height of the element 25 as measured in a direction perpendicular to the medium-facing surface 10a.

10 Claims, 23 Drawing Sheets

MAGNETORESISTANCE-EFFECT MAGNETIC HEAD

RELATED APPLICATION DATA

The present application claims priority to Japanese Application(s) No(s). P2000-326120 filed Oct. 25, 2000, which application(s) is/are incorporated herein by reference to the extent permitted by law.

BACKGROUND OF THE INVENTION

1. Field of the Invention

The present invention relates to a magnetoresistance-effect magnetic head that utilizes magnetoresistance effect to read signals magnetically recorded on a magnetic recording medium.

2. Description of the Related Art

Recording/reproducing apparatuses using a magnetic tape as a recording medium, such as a video tape recorder and a digital data recorder, are known. In such a recording/reproducing apparatus, the magnetic head writes and reads magnetic signals on and from the magnetic tape running in the apparatus, while kept in contact with the magnetic tape.

Recording/reproducing apparatuses of this type, which use a magnetic type have been modified, reducing the wavelength of signals to record data at high-density. To accomplish high-density recording, it is attempted to incorporate a magnetoresistance-effect magnetic head (hereinafter referred to as "MR head") into recording/reproducing apparatuses that use a magnetic tape. This is because the magnetoresistance-effect magnetic head can reproduce signals with high efficiency.

The MR head has hitherto been used as a data-reproducing head, mainly in hard disc drives. The MR head for use as a data-reproducing head in a hard disc drive has a magnetoresistance-effect element (hereinafter referred to as "MR element") that has magnetoresistance effect. The MR element is exposed at that surface of the MR head, which opposes the magnetic disc used as a recording medium in the disc drive. Thus exposed, the MR element can detect the signal magnetic field emanating from the magnetic disc.

The MR head is used as a data-reproducing head in recording/reproducing apparatuses using magnetic tape, too. In such a recording/reproducing apparatus, the MR head contacts the tape running while the MR head recording data on, or reproducing data from, the tape. The MR element of the MR head is exposed to the recording medium, i.e., the tape. As the tape runs, sliding on the MR element, the MR element gradually wears, changing the characteristics of the MR head gradually. Additionally, the operating reliability of the MR head decreases due to the noise made as the tape runs in sliding contact with the MR element. In view of this it is desired that an MR head for use in recording/reproducing apparatuses using magnetic tape should have an MR element that is not exposed to the magnetic tape, i.e., the recording medium.

A so-called "flux-guiding MR head" has been proposed as an MR head having an MR element not exposed to the recording medium. The flux-guiding MR head has a flux-guiding element that is made of, for example, soft magnetic thin film. The flux-guiding element is arranged, with its one end exposed to the recording medium. The flux-guiding element can therefore guide the signal magnetic field emanating from the recording medium, to the MR element.

FIG. 1 shows an example of a flux-guiding MR head 100. As shown in FIG. 1, the flux-guiding MR head 100 comprises a pair of magnetic shield layers 101 and 102, an MR element 104, and a flux-guiding element 105. The magnetic shield layers 101 and 102 are spaced apart. The layer 102 is positioned above the layer 101, providing a gap 103 between the layers 101 and 102. The MR element 104 and the flux-guiding element 105 are arranged in the gap 103. The flux-guiding element 105 has one end positioned near the surface 100a of the MR head 100, which faces the recording medium. Thus, this end of the flux-guiding element 105 is exposed at the surface 100a and opposes the recording medium. The MR element 104 is positioned at a longer distance from the surface 100a than the flux-guiding element 105 and is not exposed at the surface 100a.

In the flux-guiding MR head 100, the flux-guiding element 105 guides the signal magnetic field emanating from the magnetic recording medium, to the MR element 104. The resistance of the MR element 104 varies in accordance with the signal magnetic field guided to the MR element 104. The change in the resistance of the MR element 104 is detected as a voltage change, whereby a magnetic signal is read from the magnetic recording medium. As described above, the MR element 104 is not exposed at the surface 100a that faces the recording medium and does not contact the recording medium. The MR element 104 never wear or make noise while the recording medium, i.e., tape, is running. Hence, the MR head 100 can read the magnetic signal from the recording medium, without degrading the operating reliability.

In the flux-guiding MR head 100 of the structure described above, it is desired that the distance between the MR element 104 and the flux-guiding element 105 be as short as possible. The shorter the distance, the more efficiently the signal magnetic field can be transmitted from the flux-guiding element 105 to the MR element 104. The hither the field-transmitting efficiency, the greater the magnitude of the output. If the MR element 104 and the flux-guiding element 105 contact, however, a part of the sense current to be supplied to the MR element 104 will flow to the flux-guiding element 105. To prevent the sense current from flowing to the flux-guiding element 105, it is necessary to space the MR element 104 and the flux-guiding element 105 apart from each other by a very short distance in the flux-guiding MR head 100 that has the structure specified above.

A gap is provided between the MR element 104 and the flux-guiding element 105 in a specific manner. As FIG. 2 shows, an electrically insulating film 106 is formed, covering the MR element 104, before the flux-guiding element 105 is formed. Once the flux-guiding element 105 is formed, that part of the film 106, which is deposited on one side of the MR element 104 lies between the MR element 104 and the flux-guiding element 105, spacing the MR element 104 from the flux-guiding element 105. The gap between the elements 104 and 105 is therefore determined by the thickness of that part of the electrically insulating film 106.

Here arises a problem. It is extremely difficult to control the thickness of the insulating film 106 deposited on said side of the MR element 104, with high precision of nanometer order. In the flux-guiding MR head 100 of the structure described above, the operating efficiency of the MR element 104 will sharply decrease even if the distance between the MR element 104 and the flux-guiding element 105 changes a little. In view of this it is considered very difficult to manufacture, in a high yield, flux-guiding MR heads that can generates outputs of large magnitude.

BRIEF SUMMARY OF THE INVENTION

The present invention has been made in view of the foregoing. An object of the invention is to provide a flux-guiding MR head in which the distance between the magnetoresistance-effect element and the flux-guiding element can be controlled with high precision and which can therefore generate a large output.

A magnetoresistance-effect element and a flux-guiding element can be spaced apart from each other by forming an electrically insulating film between them. It is relatively easy to control the thickness of the insulating film, as measured in the direction of depositing the insulating film. Hence, the distance between the magnetoresistance-effect element and the flux-guiding element can be controlled with high precision, only if the elements are formed at different levels, one overlapping the other.

In a magnetoresistance-effect magnetic head of the structure described above, the efficiency of transmitting a signal magnetic field from the flux-guiding element to the magnetoresistance-effect element greatly depends not only on the distance between these elements, but also on the distance for which the elements overlaps each other. It follows that the signal magnetic filed can be very efficiently transmitted from the flux-guiding element to the magnetoresistance-effective element if the distance between these elements and the overlapping distance thereof are set at optimal values. The flux-guiding MR head can then generates a large-magnitude output.

A magnetoresistance-effect magnetic head according to the invention has been devised based on the finding described above. The flux-guiding MR head has a medium-facing surface and comprises an upper magnetic shield layer, a lower magnetic shield layer, an inter-shield gap, a magnetoresistance-effect element, and a flux-guiding element. The inter-shield gap is provided between the upper and lower magnetic shield layers. The magnetoresistance-effect element is provided in the inter-shield gap and is not exposed at the medium-facing surface. The flux-guiding element has one end exposed at the medium-facing surface. It guides an external magnetic field to the magnetoresistance-effect element. In the flux-guiding MR head, the magnetoresistance-effect element is arranged at a different level from the flux-guiding element. An electrically insulating film is interposed between the magnetoresistance-effect element and the flux-guiding element. That part of the magnetoresistance-effect element which lies close to the medium-facing surface overlaps that part of the flux-guiding element which lies remote from the medium-facing surface. The magnetoresistance-effect element overlaps the flux-guiding element for a distance that falls within a range of 15 to 25% of the length of the magnetoresistance-effect element as measured in a direction perpendicular to the medium-facing surface.

The magnetoresistance-effect magnetic head can read magnetic signals from a magnetic recording medium, while set in contact with the magnetic recording medium. That is, the flux-guiding element, which has one end exposed at the medium-facing surface, guides the signal magnetic field emanating from the medium, to the magnetoresistance-effect element, which reads the signals recorded on the medium, by utilizing its magnetoresistance effect.

The shorter the distance between the magnetoresistance-effect element and the flux-guiding element, the more efficiently the signal magnetic field can be transmitted from the flux-guiding element to the magnetoresistance-effect element. The distance can be maintained short to a precise value in the magnetoresistance-effect magnetic head according to the invention, for the following reason. The magnetoresistance-effect element is arranged at a different level from the flux-guiding element. Therefore, that part of the magnetoresistance-effect element which lies close to the medium-facing surface overlaps that part of the flux-guiding element which lies remote from the medium-facing surface, with the electrically insulating film interposed between the magnetoresistance-effect element and the flux-guiding element. Thus, the distance between the elements can be accurately adjusted, merely by controlling the thickness of the electrically insulating film. The efficiency of transmitting the signal magnetic field from the flux-guiding element to the magnetoresistance-effect element is thereby enhanced. Hence, the magnetic head can reproduce signals from the medium with high efficiency.

The efficiency of transmitting the signal magnetic field from the flux-guiding element to the magnetoresistance-effect element depends upon the distance by which the magnetoresistance-effect element overlaps the flux-guiding element. In the magnetic head of this invention, the magnetoresistance-effect element overlaps the flux-guiding element for a distance that falls within a range of 15 to 25% of the length of the magnetoresistance-effect element as measured in a direction perpendicular to the medium-facing surface. This increases the efficiency of transmitting the signal magnetic field from the flux-guiding element to the magnetoresistance-effect element even more. The magnetic head can therefore reproduce signals from the medium with an even higher efficiency.

In the magnetoresistance-effect magnetic head according to this invention, the magnetoresistance-effect element is arranged at a different level from the flux-guiding element. The part of the magnetoresistance-effect element which lies close to the medium-facing surface, therefore, overlaps that part of the flux-guiding element which lies remote from the medium-facing surface, with the electrically insulating film interposed between the magnetoresistance-effect element and the flux-guiding element. Hence, the distance between the elements can be accurately adjusted, merely by controlling the thickness of the electrically insulating film. The efficiency of transmitting the signal magnetic field from the flux-guiding element to the magnetoresistance-effect element is thereby enhanced. The magnetic head can reproduce signals from the medium with high efficiency.

In the magnetoresistance-effect magnetic head of the invention, the magnetoresistance-effect element overlaps the flux-guiding element for a distance that falls within a range of 15 to 25% of the length of the magnetoresistance-effect element as measured in a direction perpendicular to the medium-facing surface. This makes it possible to transmit the signal magnetic field from the flux-guiding element to the magnetoresistance-effect element, even more efficiently. The magnetic head can therefore reproduce signals from the medium with an even higher efficiency.

DETAILED DESCRIPTION OF THE INVENTION

Embodiments of the present invention will be described in detail, with reference to the accompanying drawings.

The first embodiment of the invention is a magnetoresistance-effect head (hereinafter referred to as "MR head" for use as a reproducing head in a recording/reproducing apparatus. Like a video tape recorder, the apparatus performs helical scanning, thereby to records and reproduces signals on and from a magnetic tape.

Figure 1:
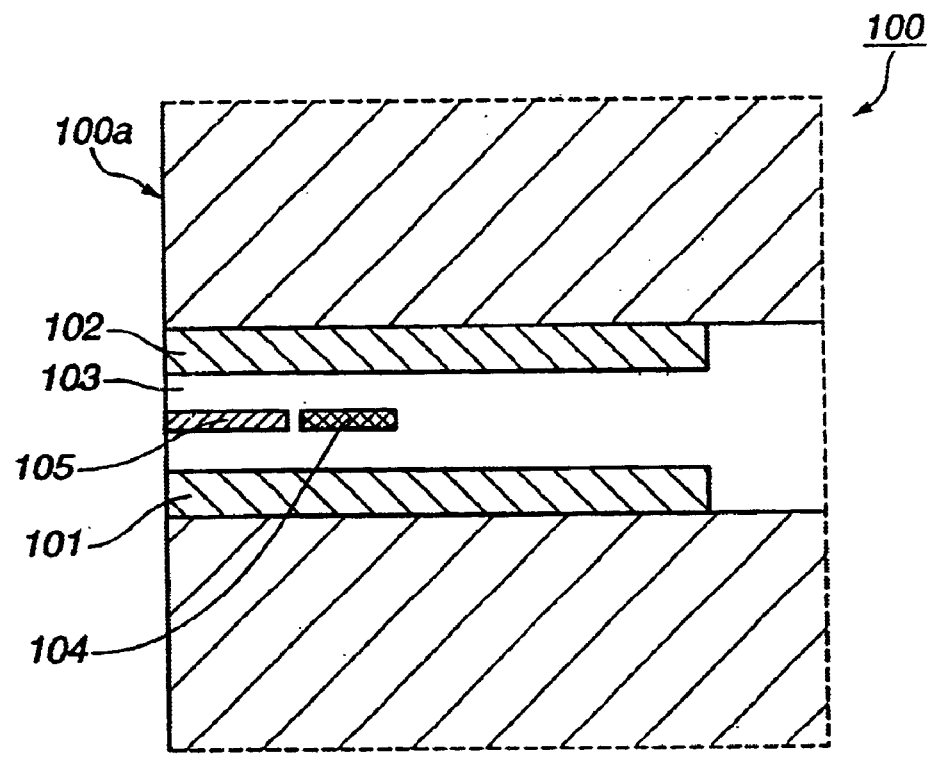
FIG. 1 is a sectional view showing a conventional flux-guiding MR element.
Figure 2:
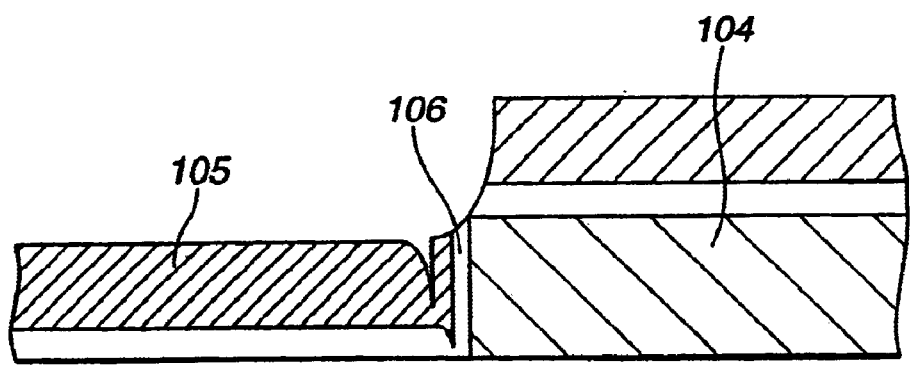
FIG. 2 is a diagram explaining a method of adjusting the distance between the MR element and flux-guiding element provided in the conventional flux-guiding MR element.
Figure 3:
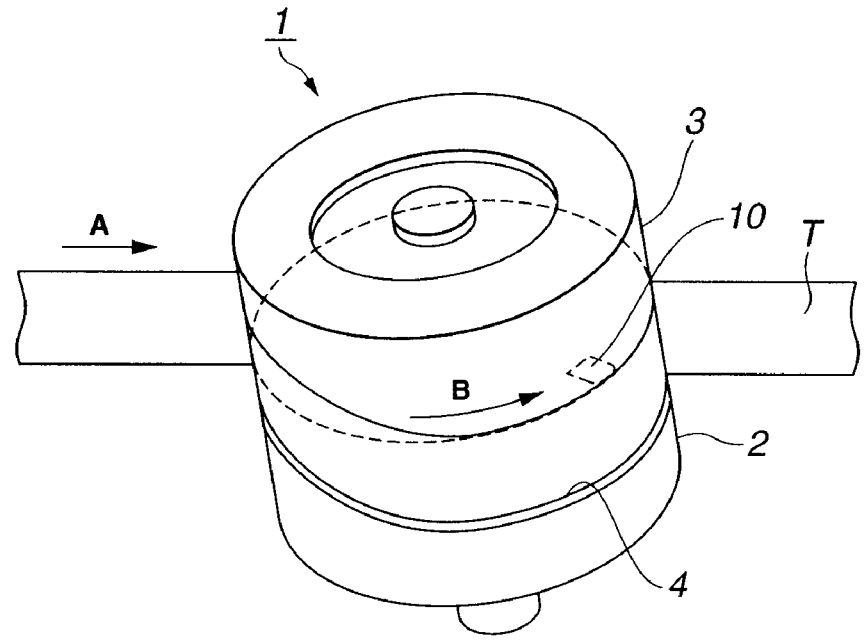
FIG. 3 is a perspective view of the rotary magnetic head device that incorporates an MR head according to the present invention.

As FIG. 3 shows, the recording/reproducing apparatus incorporates a rotary magnetic head device 1. The rotary magnetic head device 1 comprises a stationary drum 2 and a rotary drum 3. The rotary drum 3 is coaxial with the stationary drum 2 and driven by an electric motor (not shown).

The stationary drum 2 has a tape-guiding groove 4 that is made in the outer circumferential surface. The groove 4 guides a magnetic tape T wrapped around the stationary drum 2 and keeps the tape T in a specific position. The tape-guiding groove 4 inclines at a prescribed angle to a direction perpendicular to the axis of the stationary drum 2. The magnetic tape T is helically wrapped around the outer circumferential surface of the rotary magnetic head device 1, with its lower edge held in the tape-guiding groove 4.

The rotary drum 3 is mounted on the shaft of the electric motor and positioned coaxial with the electric motor. The motor can rotate the rotary drum 3. The rotary drum 3 incorporates the MR head 10 according to this invention, which is used as reproducing head for reading magnetic signals from the magnetic tape T. More specifically, a support member (not shown) secures the MR head 10 to the rotary drum 3, with its distal end (i.e., medium-facing surface) faces the magnetic tape T. The rotary drum 3 incorporates an inductive magnetic head, too. The inductive head is provided to record magnetic signals on the magnetic tape T. The inductive head is not shown. Nor will it be described in detail in the present specification.

The magnetic tape T is guided in the direction of arrow A (FIG. 3) by the tape-driving device provided in the recording/reproducing apparatus of helical scan type, the tape T is wrapped around the outer circumferential surface of the rotary magnetic head device 1 through an angle of, for example, 180°. More precisely, the tape T is wrapped around the rotary magnetic head device 1, along the tape-guiding groove 4 made in the outer circumferential surface of the stationary drum 2. In other words, the magnetic tape T is helically wrapped around the outer circumferential surface of the rotary magnetic head device 1.

To reproduces a magnetic signal from the magnetic tape T in the recording/reproducing apparatus of helical scan type, the rotary drum 3 is rotated, with the magnetic tape T wrapped around the outer circumferential surface of the rotary magnetic head device 1. As the rotary drum 3 is rotated, the MR head 10 of the invention, which secured to the rotary drum 3, moves along the outer circumferential surface of the rotary magnetic head device 1, or in the direction of arrow B shown in FIG. 3. Thus, the MR head 10 slides on the recording surface of the magnetic tape T wrapped around the outer circumferential surface of the device 1, while moving along a line inclined to the lengthwise direction of the magnetic tape T. The MR head 10 reads the magnetic signal recorded on the signal-recording surface of the magnetic tape T.

Figure 4:
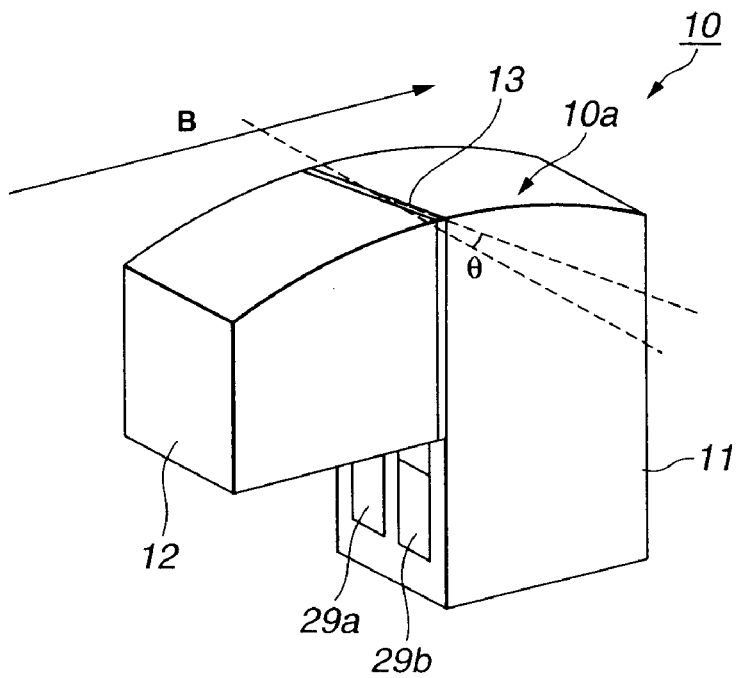
FIG. 4 is a perspective view of the MR head according to this invention.

As shown in FIG. 4, the MR head 10 comprises two substrates 11 and 12, both made of hard materials. The first substrate 11 and the second substrate 12 are bonded together, one at one side to one side of the other. A magnetism-detecting section 13 is interposed between the first substrate 11 and the second substrate 12. The magnetism-detecting section 13 is configured to detect signal magnetic fields emanating from the magnetic tape T. The upper surface of the first substrate 11 and the upper surface of the second substrate 12 are arcuate, defining a medium-facing surface 10a that contacts the magnetic tape T. The medium-facing surface 10a has a predetermined radius of curvature. The magnetism-detecting section 13 is inclined to the direction (arrow B) in which the MR head 10 moves, at an azimuth angle θ.

Figure 5:
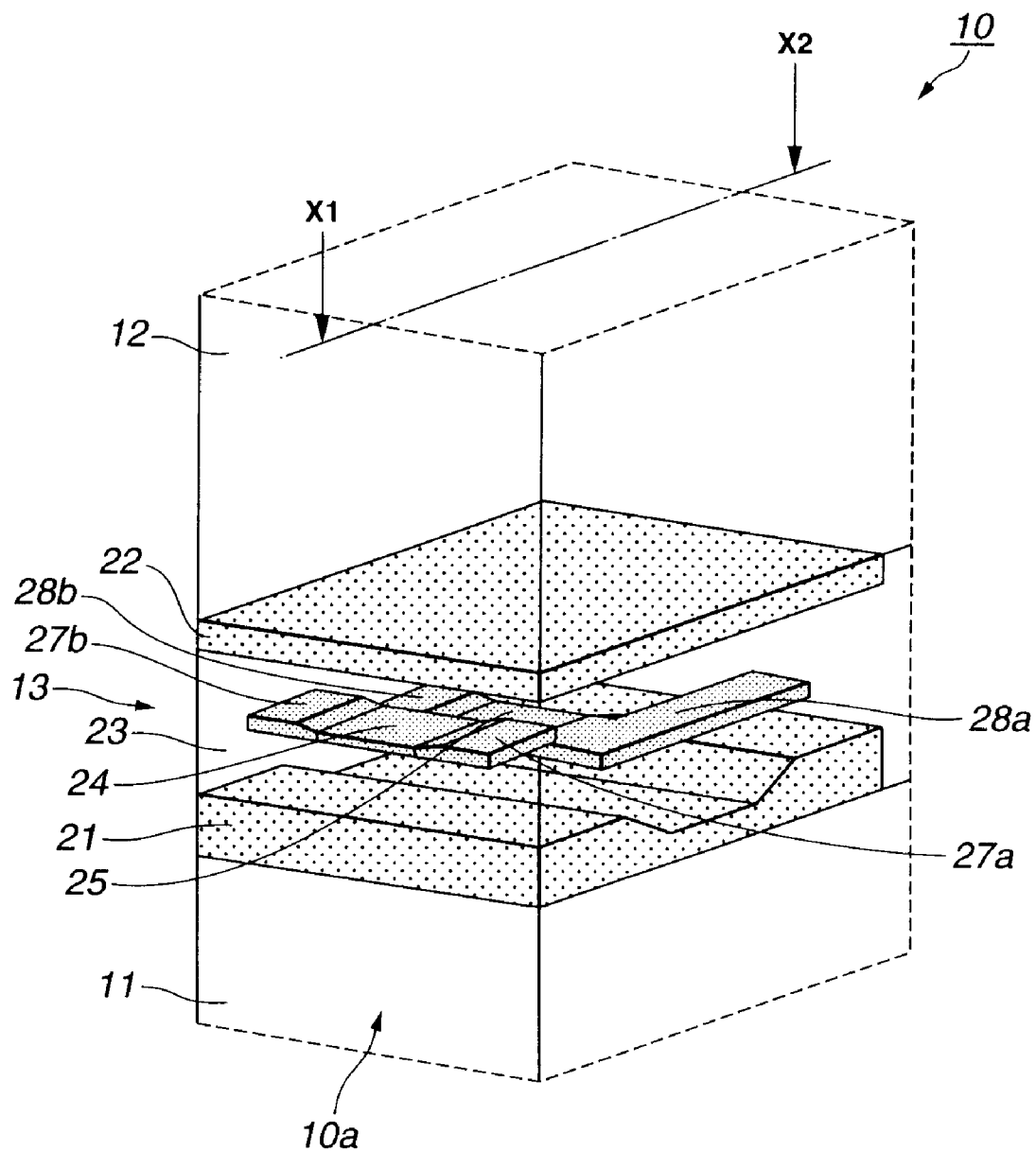
FIG. 5 is a magnified, perspective view of the magnetism-detecting section of the MR head.
Figure 6:
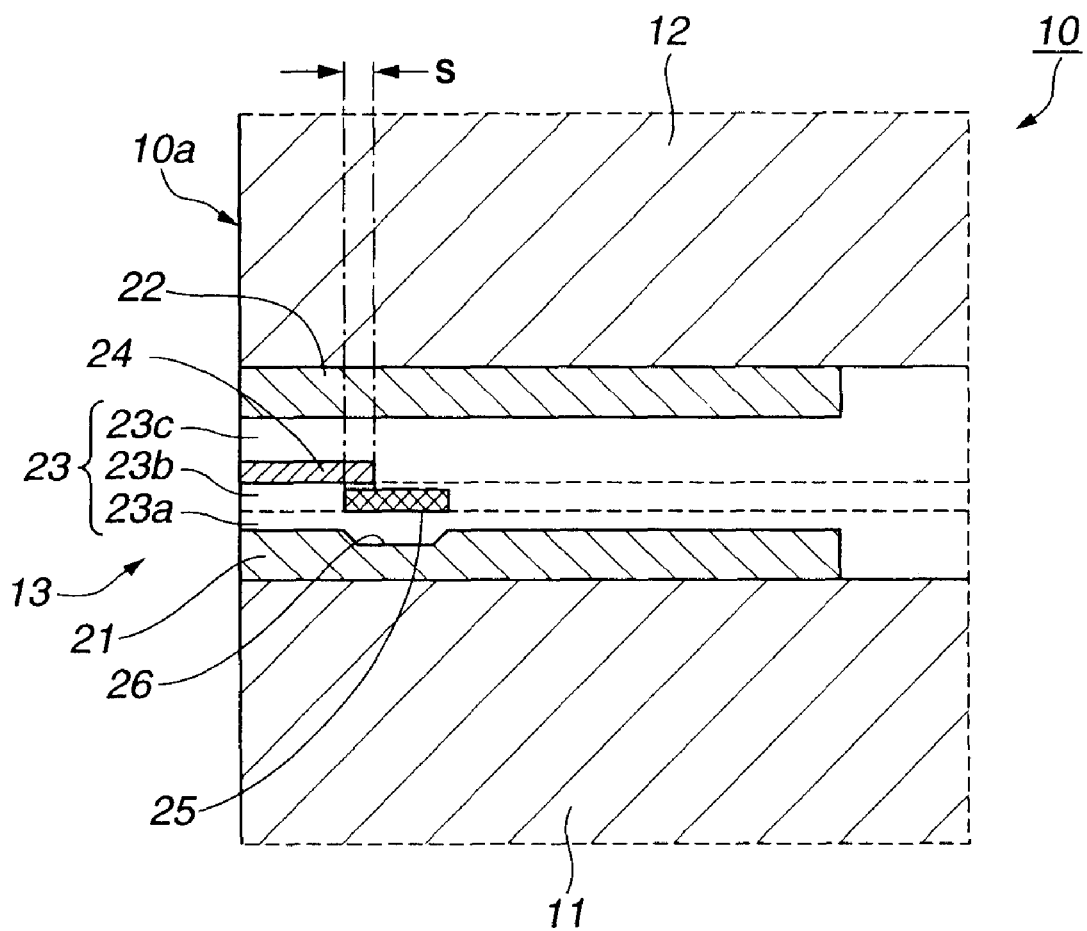
FIG. 6 is a sectional view taken along line X1-X2 shown in FIG. 5.

As FIGS. 5 and 6 show, the magnetism-detecting section 13 has a pair of magnetic shield layers 21 and 22, an inter-shield gap 23, a flux-guiding element 24. The section 13 has a flux-guiding element 24 and a magnetoresistance-effect element 25 (hereinafter referred to as "MR element 25"), too. The magnetic shield layers 21 and 22 are spaced apart from each other, the former lying below the latter. The inter-shield gap 23 is provided between the lower magnetic shield layer 21 and the upper magnetic shield layer 22. Both the flux-guiding element 24 and the MR element 25 are provided in the inter-shield gap 23. FIG. 5 is a magnified, perspective view of the magnetism-detecting section 13 of the MR head 10, and FIG. 6 is a sectional view taken along line X1-X2 shown in FIG. 5.

The lower magnetic shield layer 21 is composed of a base layer and a soft-magnetic film. The soft-magnetic film is formed on the base layer. It is about 3 μm thick and made of soft-magnetic material such as Ni—Fe alloy (known as "Permalloy") or Fe-Si-Al alloy (known as "Sendust"). The lower magnetic shield layer 21 cooperates with the upper magnetic shield layer 22 to shield the external magnetic fields. That is, the shield layers 21 and 22 prevent the external magnetic fields from influencing the signal magnetic field emanating from the magnetic tape T.

In the magnetism-detecting section 13 illustrated in FIGS. 5 and 6, the flux-guiding element 24 lies halfway between the lower magnetic shield layer 21 and the upper magnetic shield layer 22. The MR element 25 lies below the flux-guiding element 24. That is, the MR element 25 is located near the lower magnetic shield layer 21 in the intershield gap 23. The MR element 25 is not sufficiently spaced from the lower magnetic shield layer 21 to be electrically and magnetically insulated from the lower magnetic shield layer 21. The lower magnetic shield layer 21 has a groove 26 positioned below the MR element 25, whereby the MR element 25 is sufficiently spaced apart from the layer 21. This reliably prevents the signal magnetic field conducted from the flux-guiding element 24 to the MR element 25, from leaking to the lower magnetic shield layer 21. Additionally, this prevents the MR element 25 from being short-circuit to the lower magnetic shield layer 21. Therefore, breakdown of the MR element 25 would not occur.

The inter-shield gap 23 is a layer formed on the lower magnetic shield layer 21 and made of non-magnetic, non-conductive material such as $Al_2O_3$. The inter-shield gap 23 is composed of three gap films 23a to 23c laid one upon another. The first gap film 23a is provided on the lower magnetic shield layer 21. The second gap film 23b is formed on the first gap film 23a. The third gap film 23c is formed on the second gap film 23b. The MR element 25 is mounted on the first gap film 23a and covered with the second gap film 23b. The flux-guiding element 24 is mounted on the second gap film 23b and covered with the third gap film 23c.

The flux-guiding element 24 absorbs the signal magnetic field emanating from the magnetic tape T and efficiently guides the field to the MR element 25. The element 24 is a layer made of soft-magnetic material such as an Ni—Fe alloy and provided on the second gap film 23b that is one component of the inter-shield gap 23. The element 24 has one end exposed at the medium-facing surface 10a of the MR head 10. As indicated above, the flux-guiding element 24 is provided in the inter-shield gap 23 and lies halfway between the lower magnetic shield layer 21 and the upper magnetic shield layer 22. This means that the total thickness of the first and second gap films 23a and 23b, both positioned below the flux-guiding element 24, is equal to the thickness of the third gap film 23c that lies above the flux-guiding element 24.

It is desired that the flux-guiding element 24 should exhibit such magnetic anisotropy that its easy magnetization axis extends parallel to the medium-facing surface 10a of the MR head 10. The magnetic anisotropy of the element 24 is so controlled by one of two alternative methods. In the first method, soft magnetic material such as an Ni—Fe alloy is deposited by sputtering in a magnetic field, thus forming the flux-guiding element 24. In the second method, a film of soft magnetic material, such as an Ni—Fe alloy, is formed and then subjected to static field annealing (SFA). Once its magnetic anisotropy has been so controlled, the flux-guiding element 24 has a broad dynamic range with respect to the signal magnetic field.

The flux-guiding element 24 may be electrically connected to the lower magnetic shield layer 21 and the upper magnetic shield layer 22. In this case, the flux-guiding element 24 and both magnetic shield layers 21 and 22, all exposed at the medium-facing surface 10a of the MR head 10, are at the same potential. This prevents electrical short-circuiting between the element 24 and the layers 21 and 22. The MR head 10 therefore reads the magnetic signal only.

In the MR head 10, the flux-guiding element 24 is exposed at the medium-facing surface 10a and absorbs the signal magnetic field. Hence, the width of the flux-guiding element 24 determines the width of the recording tracks provided on the magnetic tape T.

As shown in FIG. 5, two bias layers 27a and 27b are connected to the lateral edges of the flux-guiding element 24, respectively. These layers 27a and 27b are provided to apply a bias magnetic field to the flux-guiding element 24. Both layers 27a and 27b have been formed in a particular method. That is, a film of ferromagnetic material such as CoCrPt alloy or the like is formed on the second gap film 23b, i.e., one component of the inter-shield gap 23. Then, this film is processed into two layers of a specific shape. As the bias layers 27a and 27b apply a bias magnetic field to the flux-guiding element 24, the element 24 has its magnetic domain stabilized.

The bias layers 27a and 27b are thin layers of, for example, CoCrPt. They are magnetized in a prescribed direction in the process of manufacturing the MR head 10. Once so magnetized, the bias layers 27a and 27b apply a bias magnetic field to the flux-guiding element 24.

The MR element 25 has its resistance changed as the external magnetic field changes in intensity. As mentioned above, the MR element 25 lies below the flux-guiding element 24. To be more specific, it is provided on the first gap film 23a (i.e., one component of the inter-shield gap 23), not exposed at the medium-facing surface 10a. That end part of the MR element 25, which is closer to the medium-facing surface 10a than the other end part, overlaps that end part of the flux-guiding element 24, which is farther from the surface 10a than the other end part. Namely, the MR element 25 overlaps the flux-guiding element 24 for a distance S, as shown in FIG. 6, with a part of the second gap film 23b interposed between the elements 24 and 25.

Figure 7:
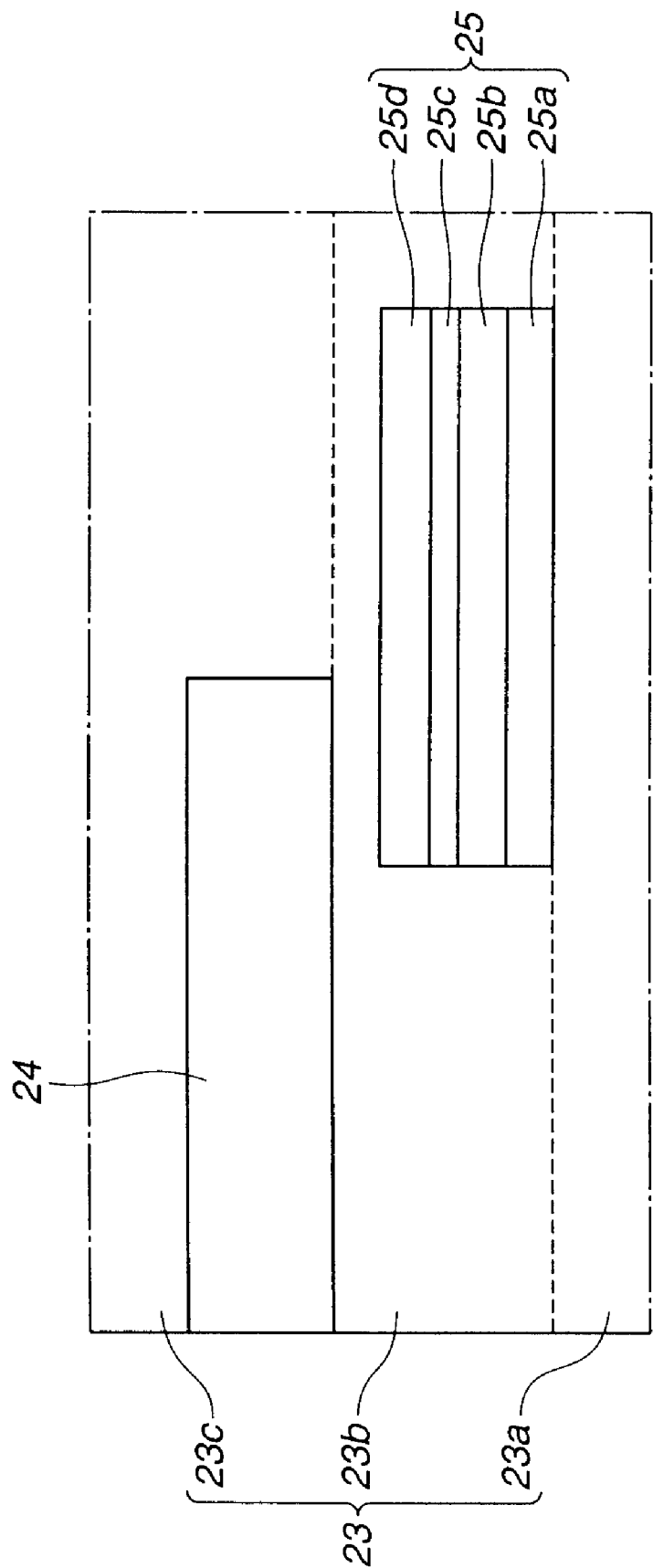
FIG. 7 is a schematic view illustrating the positional relation between the MR element and flux-guiding element that are incorporated in the MR head.

The MR element 25 is, for example, a GMR (Giant Magneto-Resistive) element of spin-valve structure, which exhibits a giant magnetoresistance effect. As FIG. 7 shows, the GMR element (i.e., MR element 25) composes an anti-ferromagnetic layer 25a, a magnetized layer (pin layer) 25b, a non-magnetic conductive layer 25c, and a magnetization-free layer (free layer) 25d. The anti-ferromagnetic layer 25a is made of Pt—Mn alloy or the like. The magnetized layer 25b is made of Ni—Fe alloy, Co, Co-Fe alloy, Co—Ni alloy, Ni—Fe—Co alloy or the like.

The non-magnetic layer 25c is made of Cu or the like. The free layer 25d is made of Ni—Fe alloy, Co, Co—Fe alloy, Co—Ni alloy, Ni—Fe—Co alloy or the like. The bias magnetic field emanating from the anti-ferromagnetic layer 25a determines the direction in which the pin layer 25b is magnetized. The magnetization direction of the free layer 25d changes in accordance with the signal magnetic field.

The layers constituting the GMR element of spin-valve structure, i.e., the MR element 25, have been formed on the first gap film 23a, one laid upon another in the order they have been mentioned. Thus, the free layer 25d lies closer to the flux-guiding element 24 than any other constituent layers of the GMR element.

As FIG. 5 illustrates, a pair of bias/electrode layers 28a and 28b are connected to the lateral edges of the MR element 25, respectively. The bias/electrode layers 28a and 28b perform two functions. The first function is to apply a bias magnetic field to the free layer 25d of the MR element 25, converting the magnetic domain to a simple magnetic domain. The second function is to supply a sense current to the MR element 25. The bias/electrode layers 28a and 28b have been formed in a particular manner. That is, a laminated film composed of, for example, a CoCrPt alloy film, a TiW film and a Ta film is formed. Then, the laminated film is processed into two layers of a specific shape, which are magnetically and electrically connected, at one end, to the lateral edges of the MR element 25. As shown in FIG. 4, the other end of each bias/electrode layer lies outside the interface between the first and second substrates 11 and 12. The bias/electrode layers 28a and 28b are connected, at the other end, to two terminals 29a and 29b, respectively. The terminals 29a and 29b are made of electrically conductive material.

The CoCrPt film included in each of the bias/electrode layers 28a and 28b is magnetized in the course of manufacturing the MR head 10. Once the CoCrPt films are magnetized, both bias/electrode layers 28a and 28b work as permanent magnets. Thus, the layers 28a and 28b therefore apply bias magnetic fields to the MR element 25.

It is desired that the bias/electrode layers 28a and 28b be configured to apply bias magnetic fields to the MR element 25 in the widthwise direction of the tracks. If the layers 28a and 28b are so configured, the free layer 25d of the MR element 25 is magnetized in the widthwise direction of the track when no signal magnetic fields are applied to the MR element 25. Thus, the free layer 25d is magnetized in the direction at right angles to the direction in which the pin layer 25b is magnetized. The MR element 25 can therefore achieve a prominent magnetoresistance effect.

In the MR head 10 it is desired that the bias magnetic fields the bias layers 27a and 27b apply to the flux-guiding element 24 extend in the same direction as the bias magnetic fields the bias/electrode layers 28a and 28b apply to the MR element 25. If the bias magnetic fields applied to the flux-guiding element 24 extend in the same direction as the bias magnetic field is applied to the free layer 25d of the MR element 25, the flux-guiding element 24 can therefore guide the external signal magnetic fields to the MR element 25 with high efficiency.

The support member (not shown), which holds the MR head 10, has a terminal section. To the terminal section, the terminals 29a and 29b of the MR head 10 are electrically connected. The MR head 10 is thereby connected to the circuit section of the recording/reproducing apparatus. The circuit section of the recording/reproducing apparatus supplies the sense current to the MR element 25 through the terminals 29a and 29b and bias/electrode layers 28a and 28b. The resistance of the MR element 25 changes in accordance with the signal magnetic field. The resistance change is detected as a voltage change in the magnetism-detecting section 13.

The upper magnetic shield layer 22 is, for example, a layer of soft magnetic material such as Ni-Fe alloy, amorphous material such as ZrNbTa, or soft magnetic material such as Fe-Si-Al alloy. The layer 22 has a thickness of, for example, about 3 μm and is deposited on the flat surface of the third gap film 23c (i.e., one component of the inter-shield gap 23). The layer 22 has been processed to have a specific shape. As pointed out above, the upper magnetic shield layer 22 cooperates with the lower magnetic shield layer 21 to shield the external magnetic fields, i.e., the magnetic fields other than the signal magnetic field emanating from the magnetic tape T. The upper magnetic shield layer 22 is boned to the second substrate 12, whereby the MR head 10 of the structure shown in FIG. 4 is provided.

The MR head 10 is held by the support member and secured to the rotary drum 3 of the rotary magnetic head device 1. When the electric motor rotates the drum 3, the MR head 10 slides on the recording surface of the magnetic tape T wrapped around the outer circumferential surface of the device 1, while moving along a line inclined to the lengthwise direction of the magnetic tape T. At this time, the flux-guiding element 24, which is exposed at the medium-facing surface 10a, absorbs the signal magnetic field emanating from the magnetic tape T and guides the signal magnetic field to the MR element 25. The resistance of the MR element 25 changes in accordance with the signal magnetic field. The resistance change is detected as a voltage change in the magnetism-detecting section 13. Thus, the MR head 10 reads the magnetic signal recorded on the magnetic tape T.

In the MR head 10 according to this invention, the MR element 25 would not slide on the magnetic tape T because it is not exposed at the medium-facing surface 10a. The MR element 25 will neither wear nor make noise while reading magnetic signals from the magnetic tape T. Hence, the MR head 10 can read magnetic signals from the tape T, with high reliability.

In the MR head 10, the flux-guiding element 24 and the MR element 25 lie at different levels. In addition, one end part of the MR element 25, which is closer to the medium-facing surface 10a than the other end part, overlaps one end part of the flux-guiding element 24, which is farther from the surface 10a than the other end part. Further, the second gap film 23b is interposed between the elements 24 and 25. Therefore, the distance between the elements 24 and 25 can be set at a very small value with high precision. This much enhances the efficiency of transmitting a signal magnetic field from the flux-guiding element 24 to the MR element 25.

In the conventional MR head, the MR element and the flux-guiding element are positioned at the same level. The distance between these elements is therefore the gap between one end of the MR element and that end of the flux-guiding element which opposes said end of the MR element. Hence, the thickness of the electrically insulating film deposited on that end of the MR element determines the distance between the MR element and the flux-guiding element. It is extremely difficult, however, to form the insulating film to a desired small thickness. The MR element and the flux-guiding element can hardly be spaced apart, precisely by the desired distance. Even if the distance differs only a little from the desired value, the efficiency of transmitting a signal magnetic field from the flux-guiding element to the MR element will greatly decrease.

In the MR head 10 of the present invention, one part of the MR element 25 and one part of the flux-guiding element 24 overlap, with the second gap film 23b interposed between the elements 24 and 25. Thus, the thickness of the second gap film 23b determines the distance between the elements 24 and 25. It is relatively easy to control the thickness of the second gap film 23b. The distance between the MR element 25 and the flux-guiding element 24 can therefore be set the desired value with high precision. As a result, the signal magnetic field is transmitted from the flux-guiding element 24 to the MR element 25 with a very high efficiency. Indeed, the efficiency of transmitting the signal magnetic field from the element 24 to the MR element 25 may decrease when the distance between the element 24 and the MR element 25 changes. Nonetheless, the decrease in the signal-transmitting efficiency is far less than in the conventional MR head. This is because the flux-guiding element 24 and the MR element 25 partly overlap each other.

Figure 8:
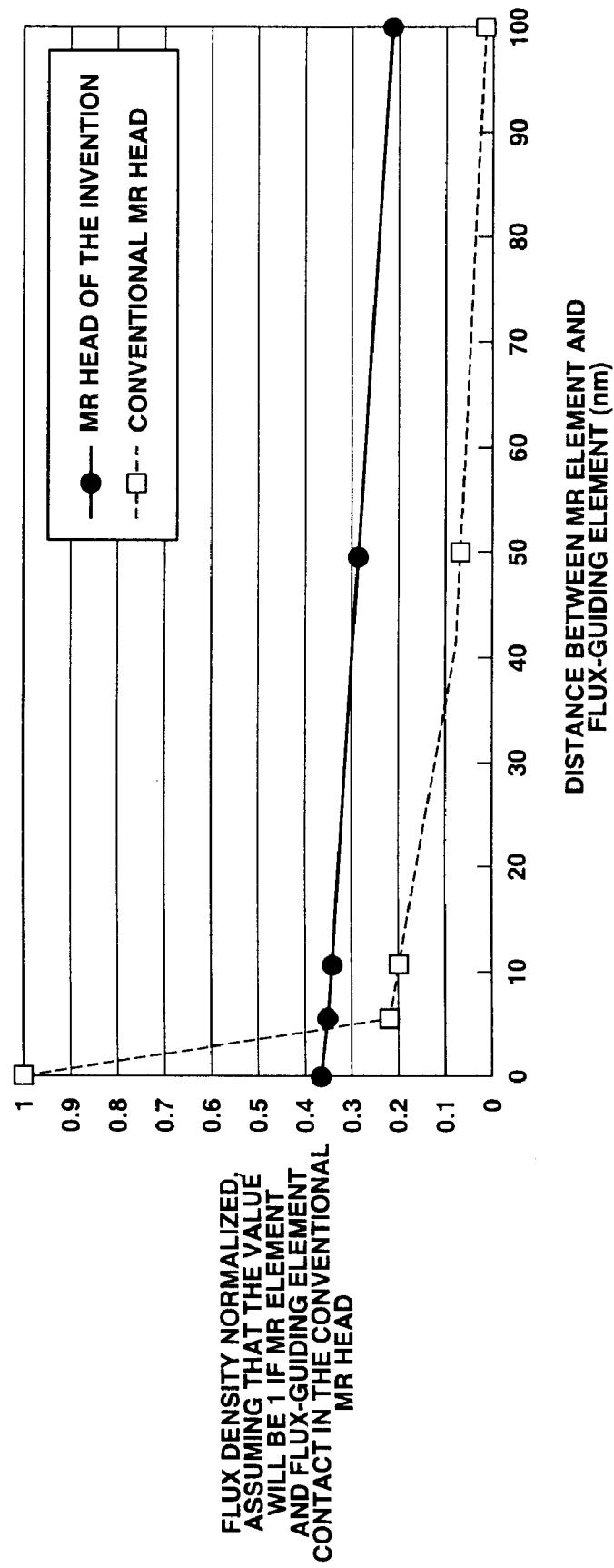
FIG. 8 is a graph representing the relation between the distance between the MR element and the flux-guiding element, on the one hand, and the flux density in the MR element, on the other hand.

The inventors hereof conducted two-dimensional simulation to determine the flux density in the MR element of the conventional MR head and the flux density in the MR element of the MR head 10 according to the present invention. In the two-dimensional simulation, the distance between the MR element and the flux-guiding element was used as parameter, for both the conventional MR head and the MR head 10 (the present invention). FIG. 8 is a graph representing the results of the two-dimensional simulation. In the graph, the ordinate indicates the flux density normalized, assuming that the flux density will be 1 if the MR element and the flux-guiding element contact each other in the conventional MR head. The abscissa indicates the distance between the MR element and the flux-guiding element. In the graph, the solid line depicts how the flux density changes in the MR element 25 of the MR head 10, and the broken line shows how the flux density changes in the MR element of the conventional MR head.

As seen from FIG. 8, the signal-transmitting efficiency abruptly falls to decreases the flux density in the MR element in the conventional MR head when the distance between the MR element and the flux-guiding element changes but a little. In the MR head 10 according to this invention, the signal-transmitting efficiency gradually falls as the distance between the MR element 25 and the flux-guiding element 24 increases. Obviously, the decrease of the flux density in the MR element 25 decreases, but far less than in the conventional MR head. A practical value for the distance between the MR element 25 and the flux-guiding element 24 may be, for example, about 10 nm. If the MR element 25 is spaced apart by 10 nm from the flux-guiding element 24, the flux density in the MR element 25 can be raised to 1.5 times the value possible with the conventional MR bead. This advantage of the MR head 10 over the conventional one may be ascribed to the fact that the flux-guiding element 24 and the MR element 25 partly overlap each other.

The distance S for which the MR element 25 overlaps the flux-guiding element 24 greatly influences the efficiency of transmitting the signal magnetic field from the flux-guiding element 24 to the MR element 25. Therefore, the signal-transmitting efficiency can be enhanced by setting the distance S at an optimal value. If the signal-transmitting efficiency is enhanced, the flux density in the MR element 25 can be increased to a maximum. The maximum flux density in the MR element 25 depends on the distance between the lower magnetic shield layer 21 and the upper magnetic shield layer 22. It depends also on whether the groove 26 is made in the lower magnetic shield layer 21 or the upper shield layer 22. Further, it depends on the length (or MR height) of the MR element 25, as measured in the direction perpendicular to the medium-facing surface 10a. The results of the two-dimensional simulation teach that the maximum flux density in the MR element 25 can be raised to a maximum, provided that the overlapping distance S falls within a specific range.

Figure 9:
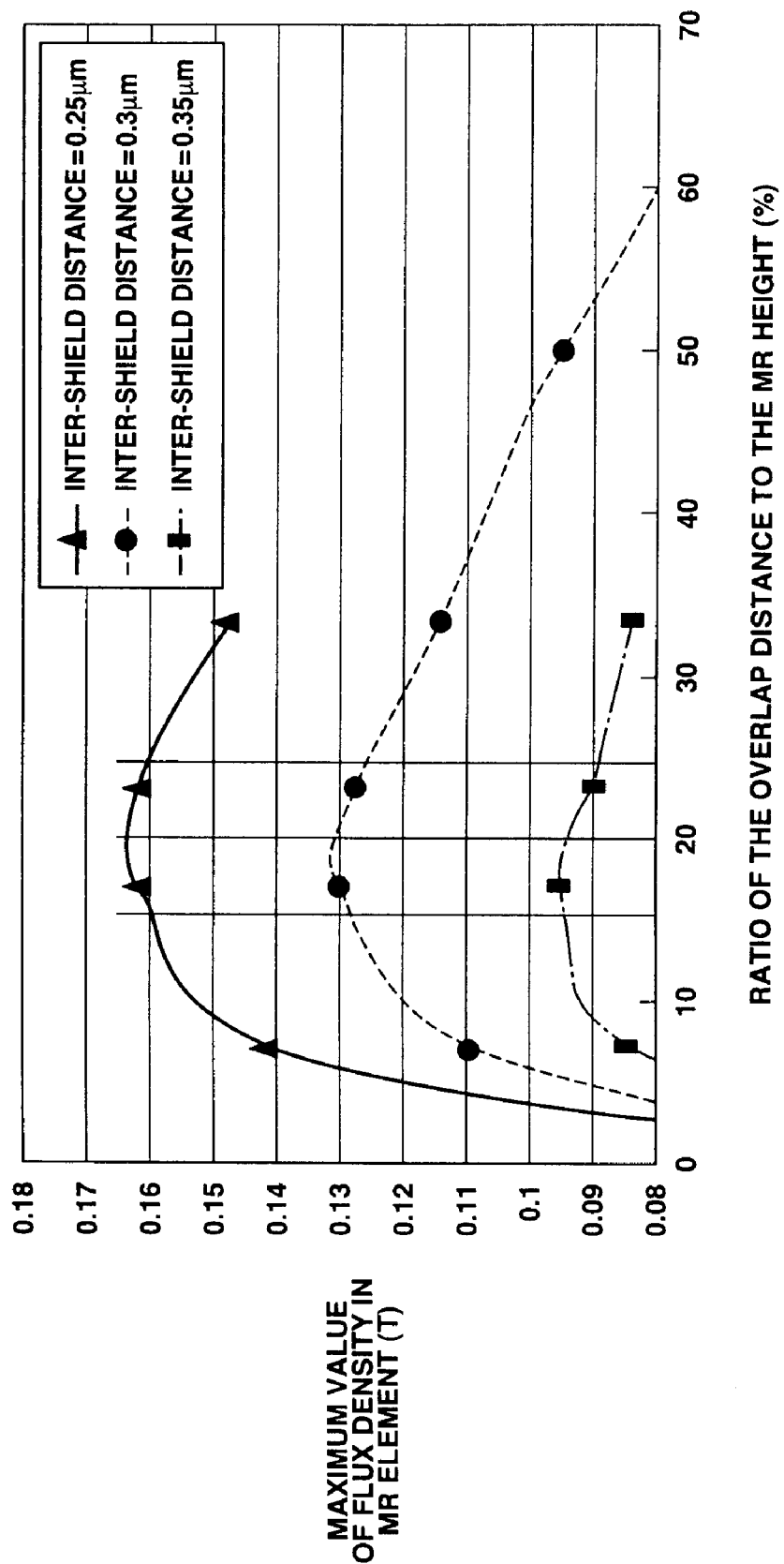
FIG. 9 is a graph depicting the relation between the ratio of the overlapping distance to the MR height and the flux density in the MR element.
Figure 10:
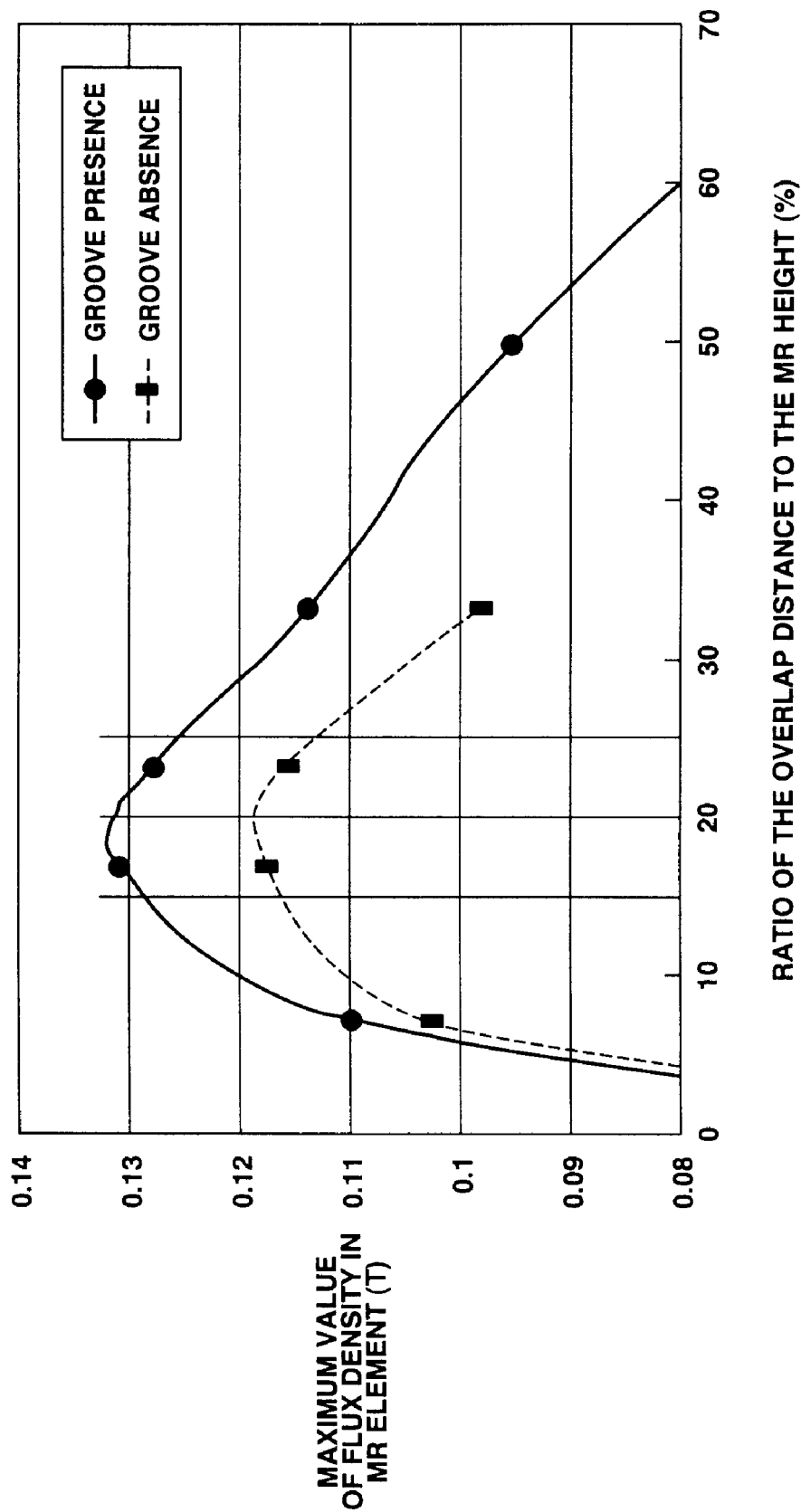
FIG. 10 is another graph illustrating the relation between the ratio of the overlapping distance to the MR height and the flux density in the MR element.
Figure 11:
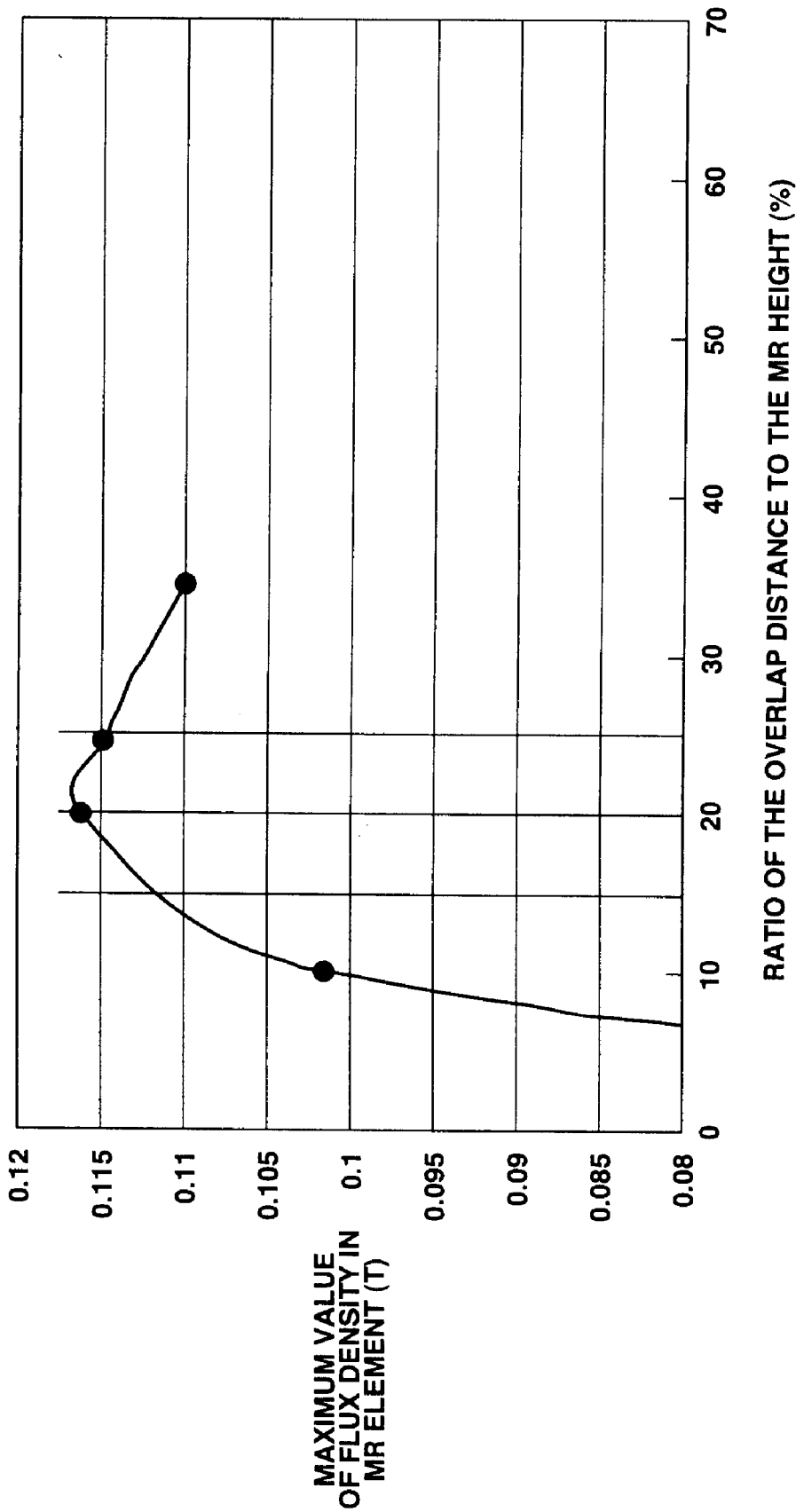
FIG. 11 is another showing the relation between the ratio of the overlapping distance to the MR height and the flux density in the MR element.

The inventors conducted another two-dimensional simulation to determine the maximum flux density in the MR element 25. In this simulation, the ratio of the distance S to the length (or MR height) of the MR element 25 was used as parameter. FIGS. 9 to 11 are graphs that show the results of the simulation. In these graphs, ordinate indicates the maximum flux density in the MR element 25, whereas the abscissa indicates the ratio of the distance S to the MR height.

To be more specific, FIG. 9 shows how the maximum flux density changes with the ratio of the distance S to the MR height in the case where the MR height is 3 μm and the lower magnetic shield layer 21 has a groove 26 that is 1 μm deep, for various distances by which the shield layers 21 and 22 are spaced apart. In FIG. 9, the solid line indicates how the maximum flux density changes when the shield layers 21 and 22 are spaced apart by a distance of 0.25 μm. The broken line indicates how the maximum flux density changes when the shield layers 21 and 22 are spaced apart by a distance of 0.3 μm. The one-dot, dashed line indicates how the maximum flux density changes when the shield layers 21 and 22 are spaced apart by a distance of 0.35 μm.

FIG. 10 depicts how the maximum flux density changes with the ratio of the overlapping distance S in the case where the MR height is 3 μm and inter-shield distance of 0.3 μm, in two particular cases. The solid line indicates how the maximum flux density changes in the case where the lower magnetic shield layer 21 has a groove 26 that is 1 μm deep. The broken line shows how the maximum flux density changes in the case where the lower magnetic shield layer 21 has no groove 26.

FIG. 11 depicts how the maximum flux density in the MR element 25 changes with the ratio of the overlapping distance S in the case where no groove 26 is made in the lower magnetic shield layer 21 and the MR height is 2 μm.

As seen from FIGS. 9 to 11, the maximum flux density in the MR element 25 is very high if the ratio of the distance S to the MR height is about 20%, regardless of whether the groove 26 is made or whichever value the MR height has. As long as the ratio of the distance S to the MR height remains within a range of 15 to 25%, the maximum flux density in the MR element 25 can be sufficiently high.

In the MR head 10, wherein the flux-guiding element 24 and the MR element 25 partly overlap each other, the efficiency of transmitting the signal magnetic field from the flux-guiding element 24 to the MR element 25 is as high as desired, only if the ratio of the distance S to the MR height falls within the range of 15 to 25%. Namely, the operating efficiency of the MR element 25 is so high that the MR head 10 may generate a very large output.

The MR element 25 described above is a GMR element of spin-valve structure that exhibits a giant magnetoresistance effect. Nonetheless, the MR element 25 may be an AMR (Anisotropic Magneto-Resistive) element that exhibits an anisotropic magnetoresistance effect, or by a GMR element of any structure other than the spin-valve structure.

Alternatively, the MR element 25 may be a TMR (Tunneling Magneto-Resistive) element. Whichever type of an MR element is used, the MR head 10 can attain the same advantage.

Figure 12:
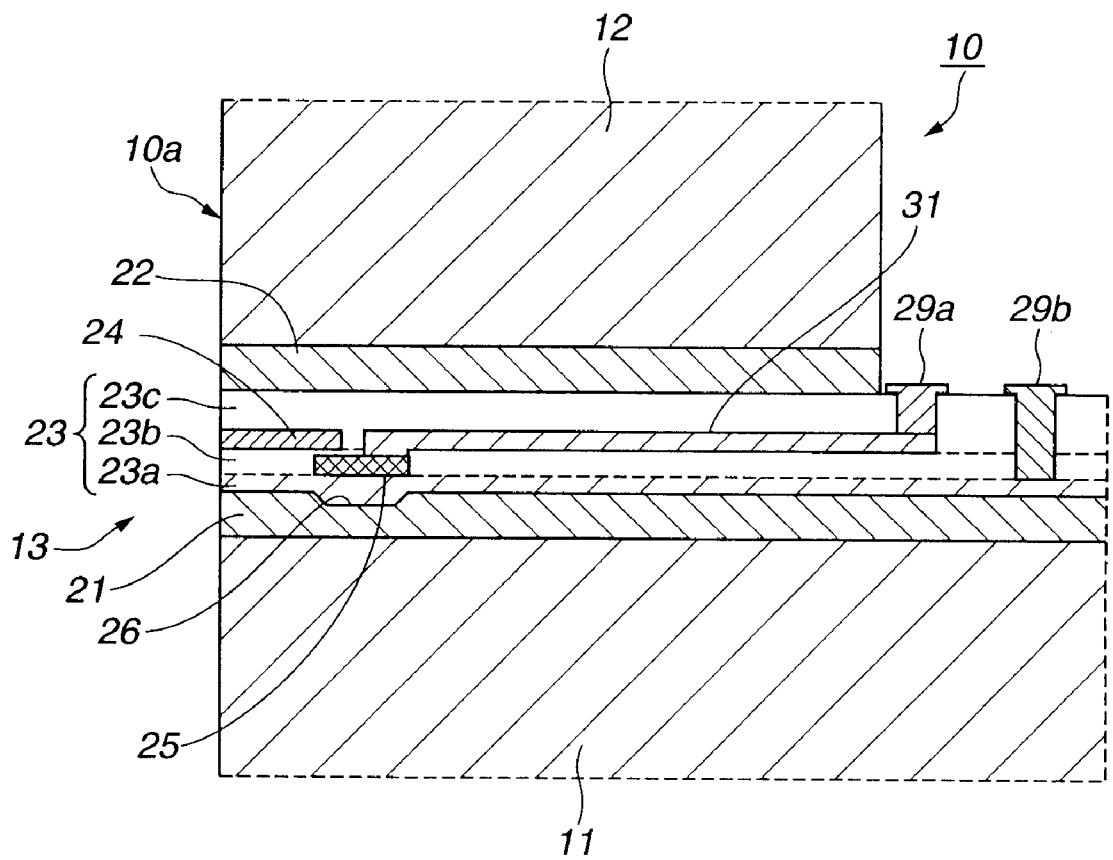
FIG. 12 is a sectional view showing an MR head of another type, according to the invention, wherein the MR element is a TMR element.

If the MR element 25 is an TMR element, the MR head 10 is modified as shown in FIG. 12 in order to make the sense current flow in a direction perpendicular to the surface of the TMR element. More specifically, an upper electrode 31 made of electrically conductive material is provided on the second gap film 23b (one component of the inter-shield gap 23). The upper electrode 31 is connected at one end to the upper surface of the MR element 25. The terminal 29a is mounted on the other end of the upper electrode 31. In the MR head 10 of FIG. 12, the first gap film 23a lying immediately below the MR element 25 is made of non-magnetic material such as Ta and functions as the lower electrode. The terminal 29b is connected to one end of the first gap film 23a which is more remote than the other end from the medium-facing surface 10a.

If the MR element 25 is an TMR element, the bias/electrode layers 28a and 28b made by processing a laminated CoCrPt/TiW/Ta layer or the like are replaced by insulating bias layers made of, for example, Co-γFe$_2$O$_3$. The insulating bias layers serve to stabilize the operating characteristics of the TMR element.

The TMR element is an laminated film comprising, for example, an anti-ferromagnetic layer made of Fe—Mn alloy, a magnetized layer (pin layer) made of Ni—Fe alloy, Co, Co—Fe alloy, Co—Ni alloy, Ni—Fe—Co alloy or the like, an insulating layer made of Al$_2$O$_3$ or the like, and a magnetization-free layer (free layer) made of Ni—Fe alloy, Co, Co—Fe alloy, Co—Ni alloy, Ni—Fe—Co alloy or the like. These layers are provided on the first gap film 23a, one laid upon another in the order they are mentioned. The free layer is positioned closer to the flux-guiding element 24 than any other layers.

Figure 13:
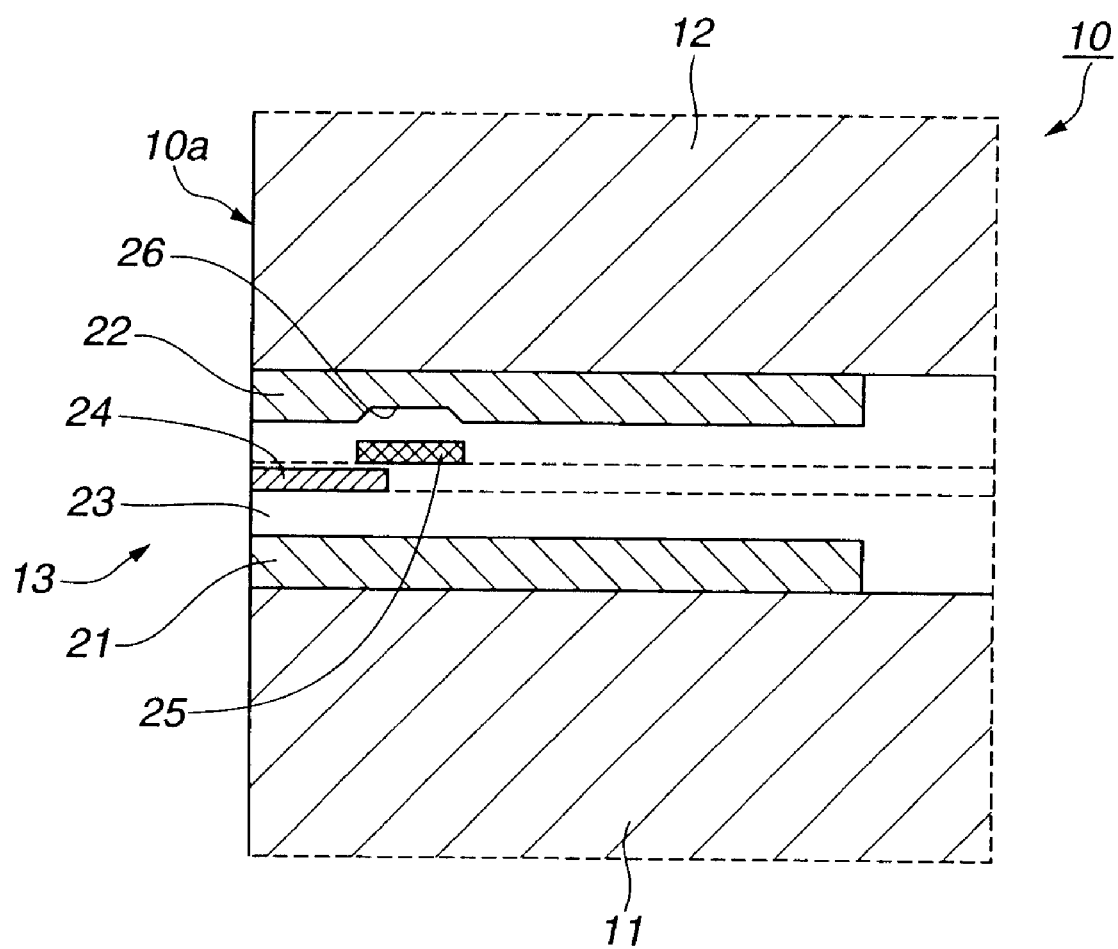
FIG. 13 is a sectional view showing an MR head of still another type, according to the invention, wherein the MR element is arranged above the flux-guiding element.

In the MR head of FIGS. 5 and 6 and the MR head of FIG. 12, the MR element 25 lies below the flux-guiding element 24. Instead, the MR element 25 may lie above the flux-guiding element 24 as is illustrated in FIG. 13. That is, the MR element 25 may be located closer to the upper magnetic shield layer 22 than the flux-guiding element 24. In this case, too, the MR head 10 attains the same advantage as the MR bead of FIGS. 5 and 6 and the MR head of FIG. 12. Moreover, the magnetic anisotropy of the flux-guiding element 24 can be well controlled, without thermally damaging the MR element 25, even if the element 24 is subjected to heat treatment, such as annealing, at a relatively high temperature. This is because the MR element 25 is formed after the flux-guiding element 24 has been formed.

In the structure of FIG. 13, wherein the MR element 25 lies above the flux-guiding element 24, the upper magnetic shield layer 22 and the element 25 may not be spaced apart by a distance long enough to insulate the upper magnetic shield layer 22 and the element 25 both electrically and magnetically. If so, a groove 26 should better be made in that part of the upper magnetic shield layer 22, which lies immediately above the MR element 25, thereby to provide a sufficient gap between the shield layer 22 and the MR element 25. If such a gap is provided, spacing the MR element 25 sufficiently from the shield layer 22, the signal magnetic field guided from the element 24 to the MR element 25 will be reliably prevented from leaking to the upper magnetic shield layer 22. This renders it possible to suppress the decrease in the efficiency of transmitting the signal magnetic field from the element 24 to the MR element 25. In addition, the breakdown of the MR element 25 can be avoided, because the MR element 25 would not be short-circuited to the upper magnetic shield layer 22.

Figure 14:
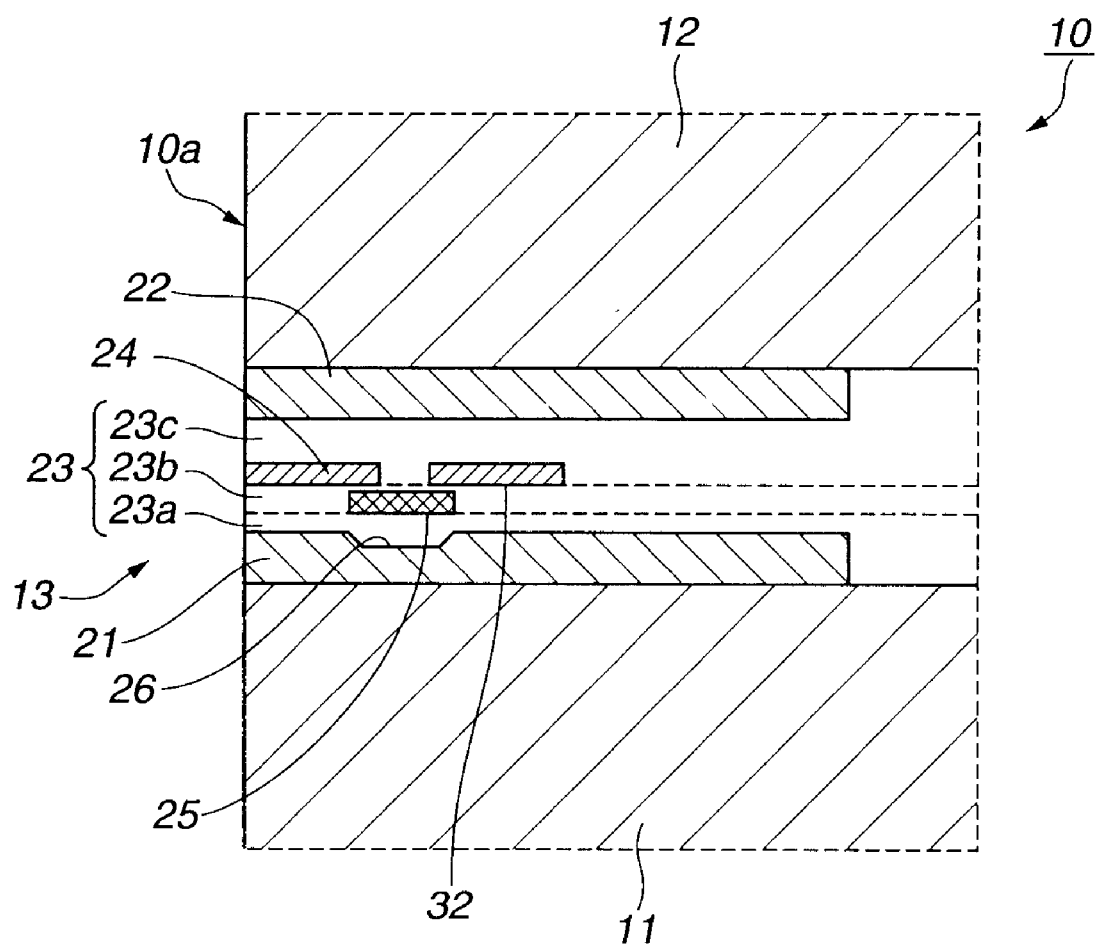
FIG. 14 is a sectional view showing an MR head of another type, according to the invention, which comprises two flux-guiding element, the second of which is more spaced from the medium-facing surface than the MR element.

In the MR head of FIGS. 5 and 6, the MR head of FIG. 12 and the MR head of FIG. 13, one flux-guiding element 24 is provided near the medium-facing surface 10a. As shown in FIG. 14, the second flux-guiding element 32 may be provided at a position remote from the medium-facing surface 10a. The second flux-guiding element 32 is provided on the second gap film 23b (an electrically insulating film). It has one end part which is closer to the surface 10a than the other end part and which overlaps that end part of the MR element 25 which is farther from the surface 10a than the other end part.

As indicated above, the second flux-guiding element 32 one end part overlapping that end part of the MR element 25 which is farther from the surface 10a than the other end part. The signal magnetic field emanating from the magnetic tape T can therefore be efficiently transmitted to the MR element 25. Furthermore, the second flux-guiding element 32 can efficiently transmit the signal magnetic field to the MR element 25 if the ratio of the distance the second flux-guiding element 32 overlaps the MR element 25 to the MR height falls within the range of 15 to 25%. This enhances the operating efficiency of the MR element 25 and, ultimately, increases the output of the MR head 10.

Figure 15:
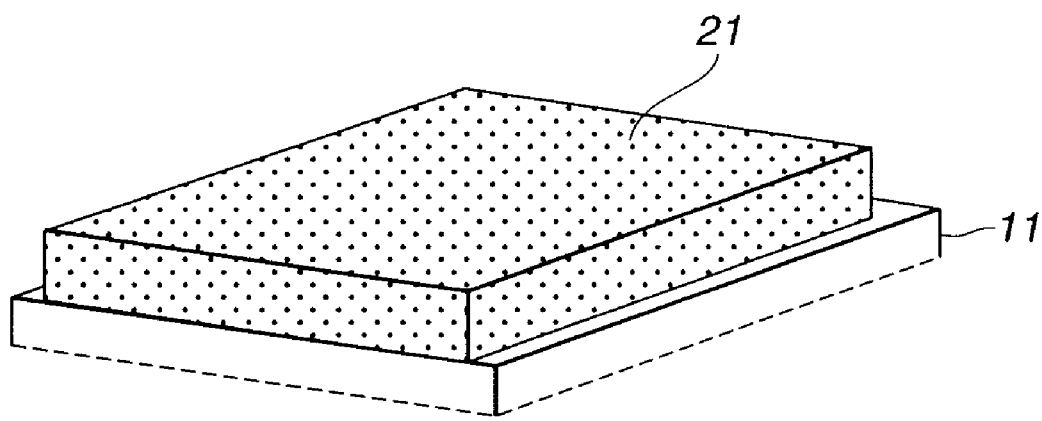
FIG. 15 is a perspective view explaining a method of manufacturing an MR head of the invention, showing the first substrate and the lower magnetic shield layer provided on the first substrate.

A method of manufacturing an MR head 10 according to this invention will be described. Note that this MR head 10 has an inter-shield distance of 0.3 μm and a tack width of 5 μm, comprises a GMR element of spin-valve structure used as MR element 25 and can record data at the density of 1 Gbit/inch$^2$. Generally, one block is processed, forming a number of MR heads 10 in the block, and is then cut into pieces, thus providing many MR heads 10 (FIG. 4) at a time. Nonetheless, the method will be explained, with reference to FIGS. 15 to 30, which show only one MR head. As FIG. 15 shows, a non-magnetic substrate (first substrate) 11 is prepared at first. The substrate 11 is coated with an oxide film. A soft-magnetic thin film of Ni—Fe alloy, Fe—Si—Al alloy or the like is formed on the first substrate 11 by means of sputtering, plating or the like. The thin film has a thickness of, for example, 3 μm. The soft-magnetic thin film is subjected to photolithography and ion etching, thus processed to a lower magnetic shield layer 21. The shield layer 21 is provided on the first substrate 11 and has a prescribed shape, as is illustrated in FIG. 15.

Figure 16:
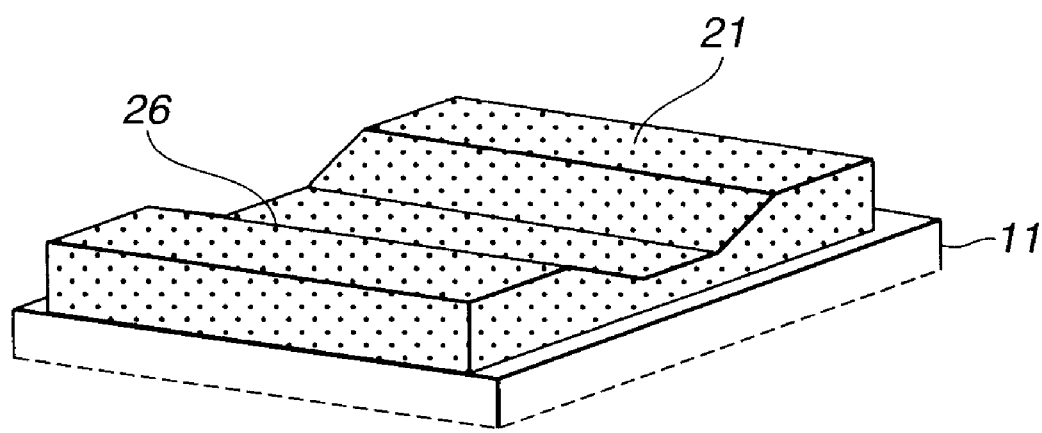
FIG. 16 is a perspective view explaining the method of manufacturing the MR head of the invention, illustrating a groove made in the lower magnetic shield layer.

Next, the lower magnetic shield layer 21 undergoes photolithography and ion etching. A groove 26 about 1 μm deep is thereby made in the upper surface of the shield layer 21 as is illustrated in FIG. 16. During the photolithography, the photo resist is heat-treated in specific conditions, imparting a tapered cross section to the photo resist, before the ion etching is performed. The groove 26 therefore has side walls that incline at a specific angle of, for example, 45°.

Thereafter, a non-magnetic, non-conductive film of, for example, $Al_2O_3$, is formed on the lower magnetic shield layer 21 having the groove 26, by means of sputtering or the like. The non-magnetic, non-conductive film has a thickness of, for example, about 2.5 μm. This film is polished by lapping using diamond grains, chemical polishing or a similar technique, until the upper surface of the lower magnetic shield layer 21 is exposed. The groove 26 is thereby filled with non-magnetic, electrically conductive material. Thus, the structure has a flat upper surface.

Figure 17:
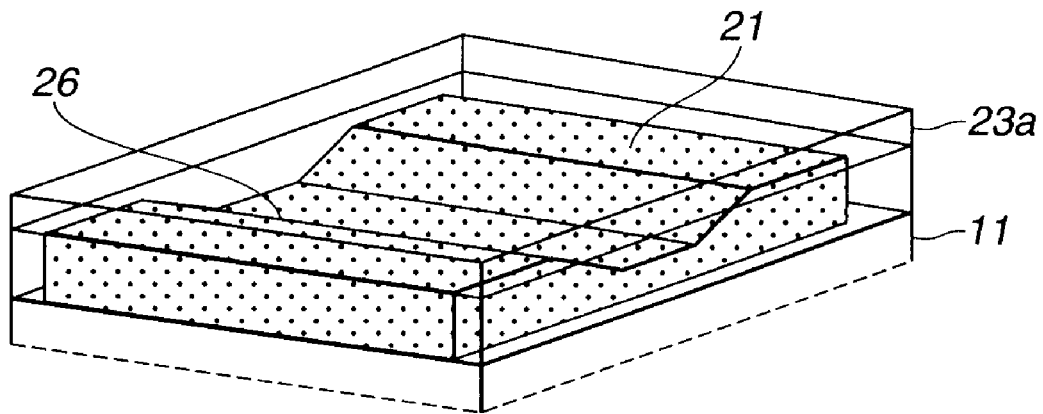
FIG. 17 is a perspective view explaining the method of manufacturing the MR head of the invention, depicting the first gap film provided on the lower magnetic shield layer.

A non-magnetic, non-conductive film of $Al_2O_3$ or the like is formed on the lower magnetic shield layer 21 having the groove 26 filled with the non-magnetic, non-conductive material, by means of sputtering or the like to a predetermined thickness. This non-magnetic, non-conductive film is polished by, for example, chemical polishing, until it becomes, for example, about 42.5 nm thick. As a result, the structure shown in FIG. 17 is obtained. As FIG. 17 shows, the first gap film 23a, i.e., one component of the shield gap 23, is provided on the lower magnetic shield layer 21.

Figure 18:
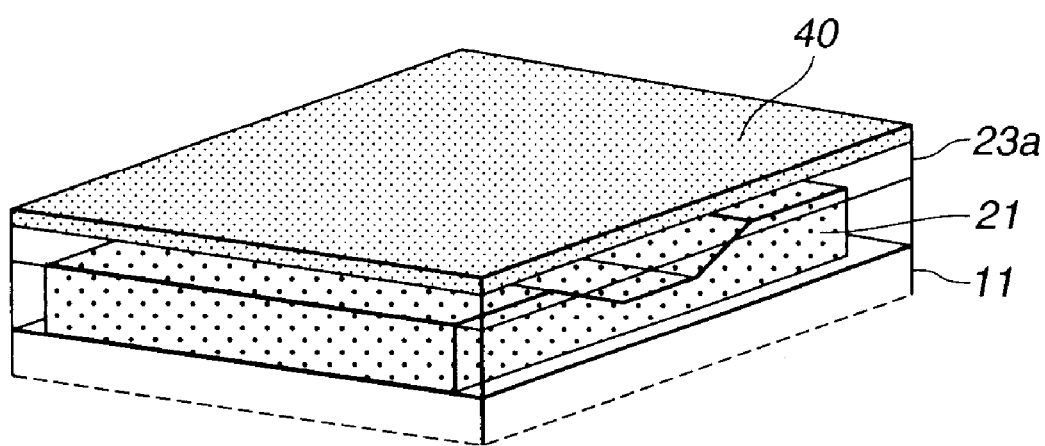
FIG. 18 is a perspective view explaining the method of manufacturing the MR head of the invention, illustrating a layer formed on the first gap film, which will be processed to provide an MR element.

As shown in FIG. 18, a laminated film 40, which will be processed into a GMR element (MR element 25) of spin-valve structure, is formed on the smooth first gap film 23a by sputtering or the like, to a thickness of, for example, 50 nm. The laminated film 40 is so positioned that the easy magnetization axis of the free layer of the GMR element extends parallel to the medium-facing surface 10a while no magnetic field is applied to the GMR element and that the easy magnetization axis of the pin layer extends perpendicular to the medium-facing surface 10a. A free layer is formed on the uppermost layer so that it may be located quite close to the flux-guiding element 24 that will be formed later.

Figure 19:
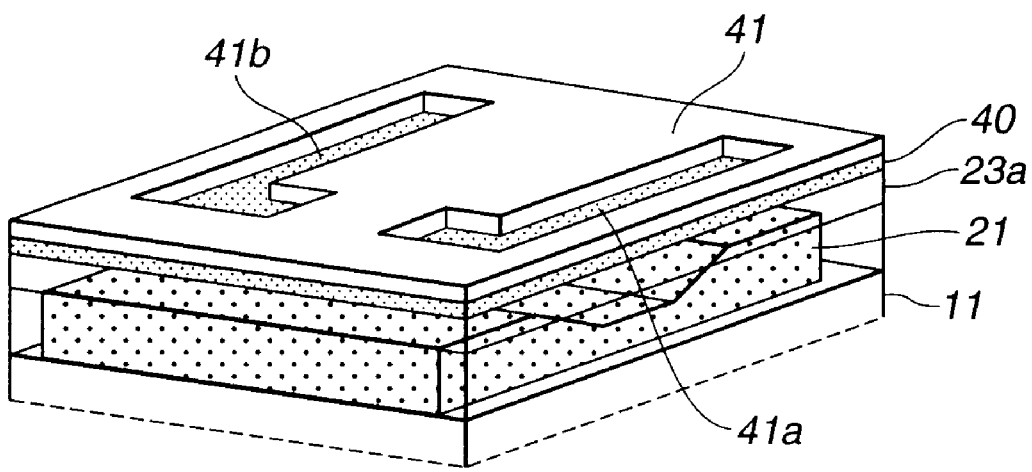
FIG. 19 is a perspective view explaining the method of manufacturing the MR head of the invention, showing a photo resist pattern formed on the layer that will be processed to provide an MR element.

Next, as shown in FIG. 19, a photo resist pattern 41 is formed on the laminated film 40 by photolithography. The photo resist pattern 41 will be used to form a pair of bias/electrode layers 28a and 28b. The pattern 41 has openings 41a and 41b that lie at positions where the bias/electrode layers 28a and 28b will be provided. Using the pattern 41 as mask, ion etching is carried out, removing those parts of the laminated film 40 which lie at the positions where the layers 28a and 28b will be formed.

The bias/electrode layers 28a and 28b are to be formed and connected to the ends of the MR element 25. It follows that the MR element 25 will be provided at the position that is determined by the positions the openings 41a and 41b take in the photo resist pattern 41. The positions of the openings 41a and 41b are therefore determined by the MR height of the element 25 and the size of the element 24, so that the distance for which the MR element 25 should overlap the flux-guiding element 24 may fall within the range of 15 to 25%.

Figure 20:
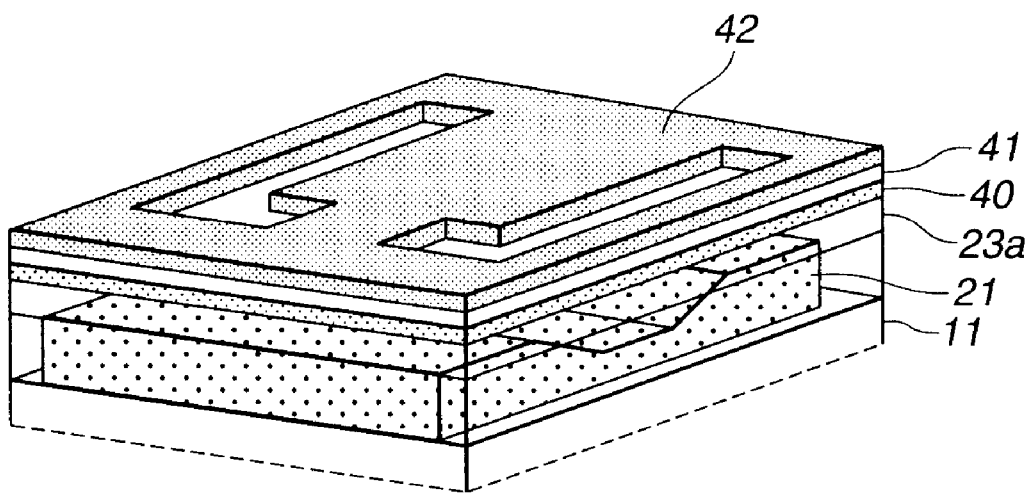
FIG. 20 is a perspective view explaining the method of manufacturing the MR head of the invention, showing a layer formed on the photo resist pattern, said layer to be processed to provide a pair of bias/electrode layers.

As FIG. 20 shows, a laminated film 42 such as a CoCrPt/TiW/Ta layer is formed on the photo resist pattern 41 by sputtering or the like, to a thickness of, for example, about 50 nm. The laminated film 42 will be processed to provide the bias/electrode layers 28a and 28b. Those parts of the laminated film 40, which lie below those parts of the film 42 which will be the layers 28a and 28b have already been removed. Hence, the laminated film 42 to be processed to provide the layers 28a and 28b is formed above the first gap film 23a that is one component of the inter-shield gap 23.

Figure 21:
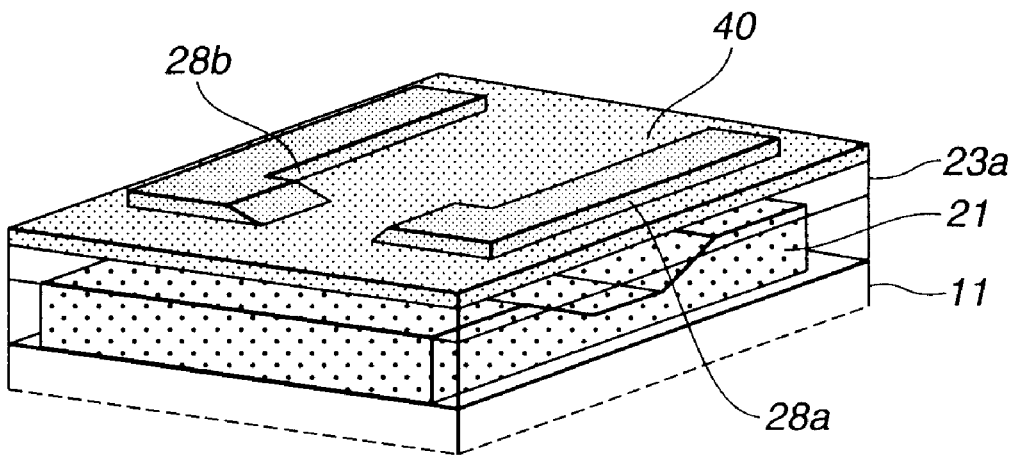
FIG. 21 is a perspective view explaining the method of manufacturing the MR head of the invention, illustrating the pair of bias/electrode layers embedded in a layer that will be processed into an MR element.

Then, the photo resist pattern 41 and the laminated film 42 are removed by means of lift-off method. As shown in FIG. 21, the bias/electrode layers 28a and 28b are now embedded in the laminated film 40.

Figure 22:
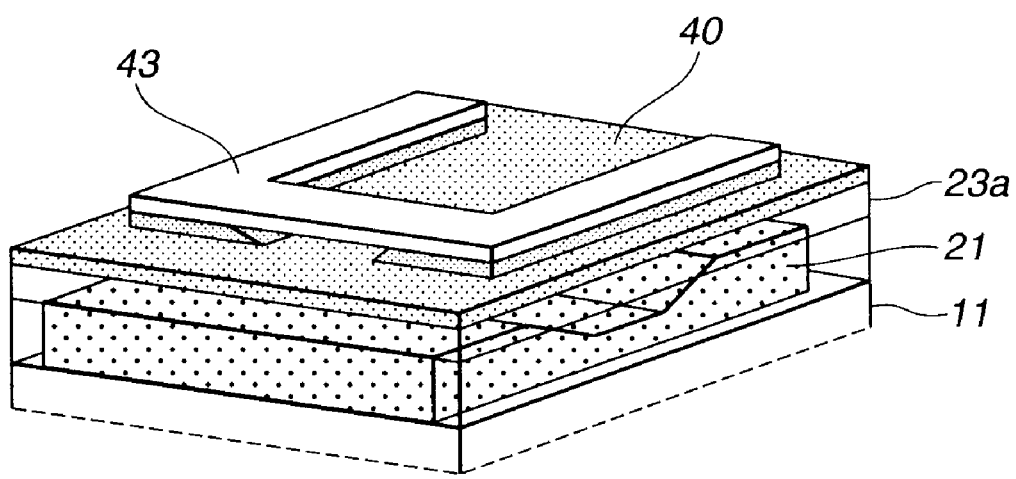
FIG. 22 is a perspective view explaining the method of manufacturing the MR head of the invention, showing a photo resist pattern formed on the pair of bias/electrode layers and the layer to be processed into the MR element.

As FIG. 22 shows, a photo resist pattern 43 is formed on the bias/electrode layers 28a and 28b, bridging these layers 28a and 28b, by photolithography. The photo resist pattern 43 lies above the laminated film 40 the position where the MR element 25 will be formed. Using the pattern 43 as mask, ion etching is performed. The laminated film is thereby removed, except the part that is the MR element 25. The MR element 25 is thereby formed, which is connected to the pair of bias/electrode layers 28a and 28b.

Figure 23:
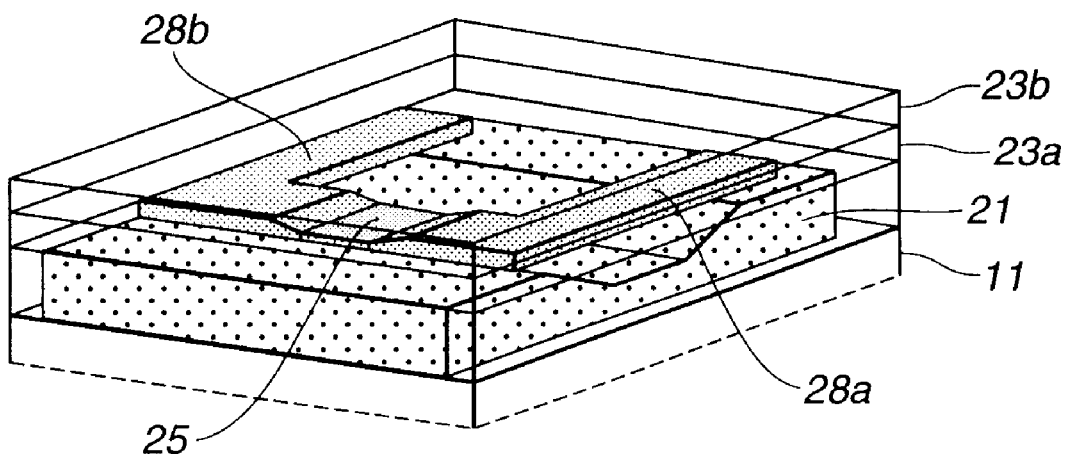
FIG. 23 is a perspective view explaining the method of manufacturing the MR head of the invention, showing the second gap film provided on the first gap film on which the MR element lies and is connected to the bias/electrode layers.

Thus, the MR element 25 has been formed on the first gap film 23a and connected to the bias/electrode layers 28a and 28b. Then, a non-magnetic, non-conductive film of $Al_2O_3$ or the like is formed, by sputtering or the like, on the first gap film 23a on which the MR element 25 lies and connected to the bias/electrode layers 28a and 28b. This film is polished by chemical polishing or the like, until its part lying on the MR element 25 grows thinner to about 42.5 nm. In other words, the non-magnetic, non-conductive film is polished until the distance between its upper surface and the upper surface of the lower magnetic shield layer 21 decreases to 135 nm. As a result, the second gap film 23b is formed on the first gap film 23a, covering the MR element 25 as is illustrated in FIG. 23.

The second gap film 23b is an electrically insulating film that is interposed between the MR element 25 and the flux-guiding element 24. The thickness of the second gap film 23b determines the distance between the MR element 25 and the flux-guiding element 24.

Figure 24:
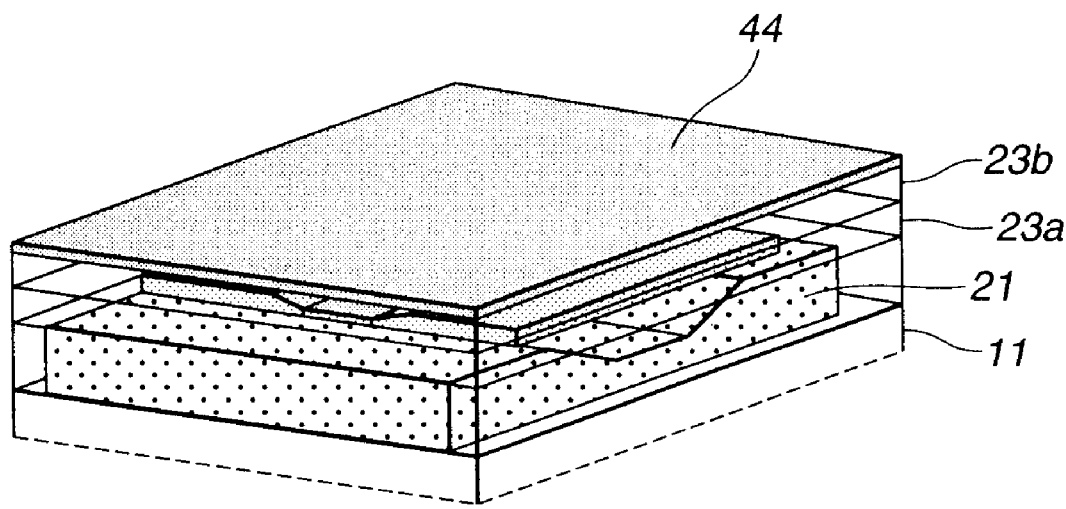
FIG. 24 is a perspective view explaining the method of manufacturing the MR head of the invention, illustrating a soft-magnetic film which is formed on the second gap film and which will be processed into a flux-guiding element.

As shown in FIG. 24, a soft-magnetic film 44 of Ni-Fe alloy or the like is formed on the second gap film 23b having a flat upper surface, by means of sputtering or the like to a thickness of about 30 nm. Note that the film 44 will be processed into the flux-guiding element. The soft-magnetic film 44 is subjected to magnetic anisotropy control so that it may have an easy magnetization axis that extends parallel to the above-mentioned medium-facing surface 10a. The magnetic anisotropy control is accomplished by first forming the film 44 by sputtering in a magnetic field or upon the second gap film 23b and then annealing the film 44 in a fixed magnetic field.

Figure 25:
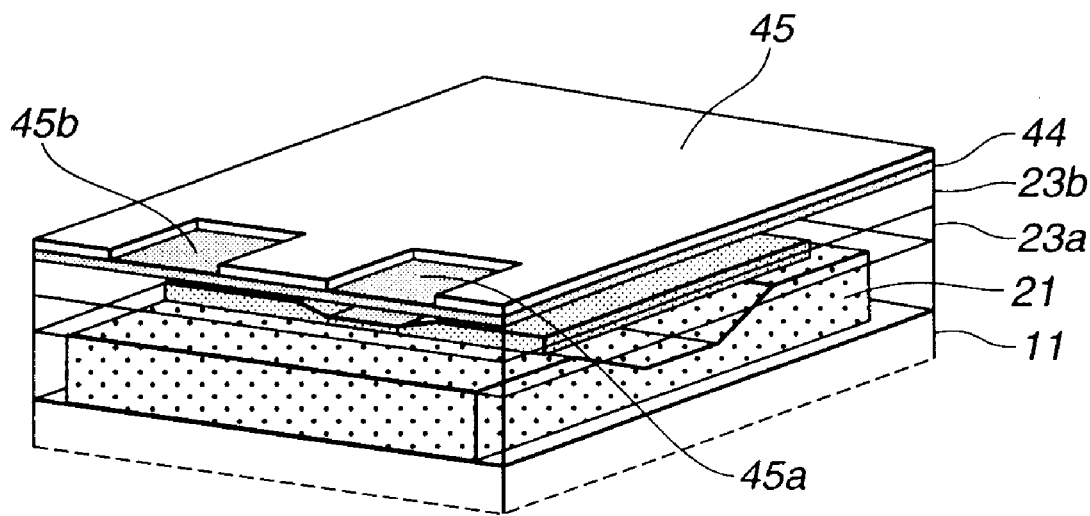
FIG. 25 is a perspective view explaining the method of manufacturing the MR head of the invention, showing a photo resist pattern formed on the soft-magnetic film that will be processed into the flux-guiding element.

As illustrated in FIG. 25, a photo resist pattern 45 is formed on the soft-magnetic film 44 by photolithography. The photo resist pattern 45, which will be used to form a pair of bias layers 27a and 27b, has openings 45a and 45b that lie above the position where the bias layers 27a and 27b will be provided. Using the photo resist pattern 45 as mask, ion etching is carried out. Those parts of the soft-magnetic film 44, at which the bias layers 27a and 27b will be formed, are thereby removed.

The bias layers 27a and 27b will be formed and connected to the ends of the flux-guiding element 24. Hence, the positions of the openings 45a and 45b made in the photo resist pattern 45 will determine the position of the flux-guiding element 24. The positions of the openings 45a and 45b are therefore determined by the position and MR height of the element 25, so that the overlap distance of the elements 25 and 24 may fall within the range of 15 to 25%.

Figure 26:
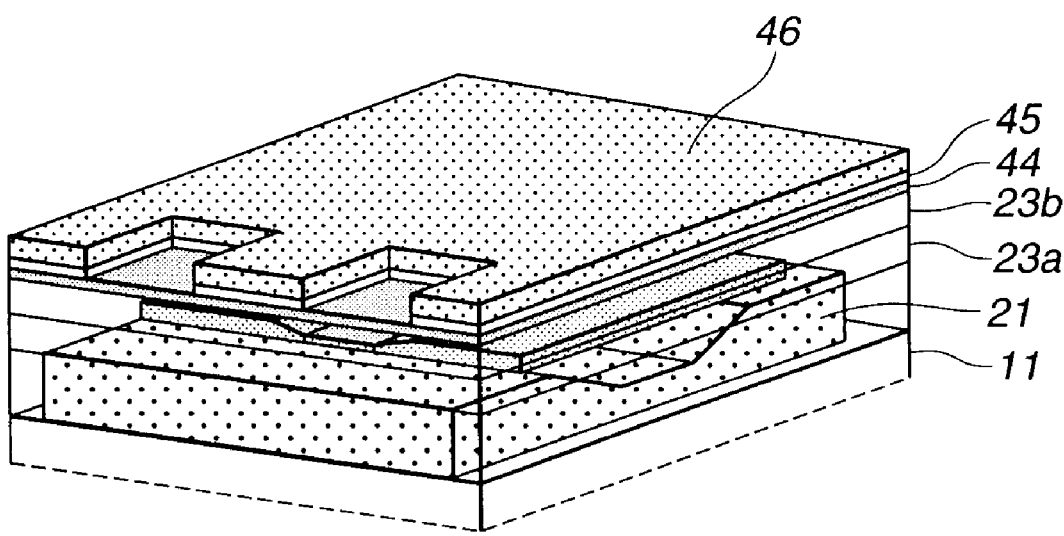
FIG. 26 is a perspective view explaining the method of manufacturing the MR head of the invention, showing a ferromagnetic film which is formed on the photo resist pattern and which will be processed into a pair of bias layers.

Next, as FIG. 26 shows, a ferromagnetic film 46 such as a CoCrPt alloy is formed on the photo resist pattern 45 by sputtering or the like, to a thickness of, for example, about 50 nm. At this time, those part of the soft-magnetic film 44, on which the bias layers 27a and 27b will be provided, have been removed. Hence, the ferromagnetic film 46 is formed above the second gap film 23b.

Figure 27:
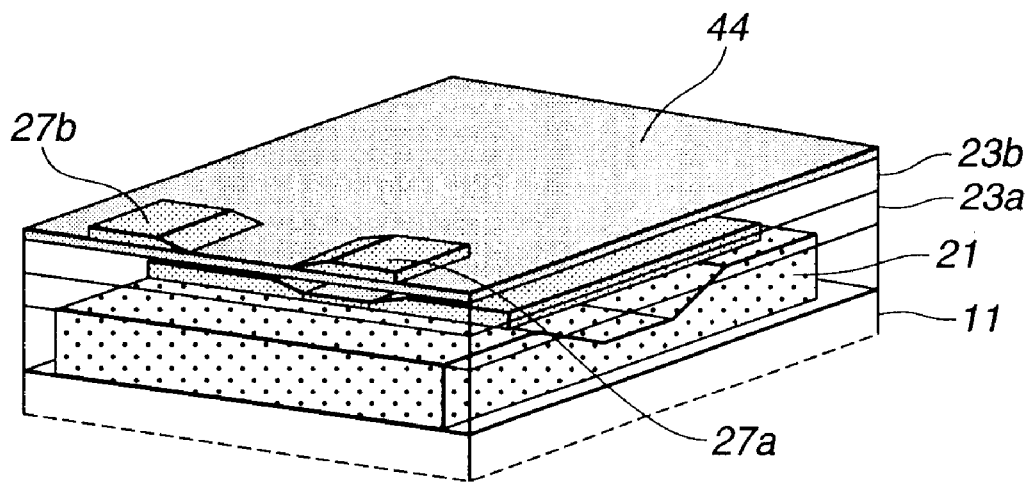
FIG. 27 is a perspective view explaining the method of manufacturing the MR head of the invention, illustrating a pair of bias layers embedded in the soft-magnetic film to be processed into the flux-guiding element.

Then, the photo resist pattern 46 and the photo resist pattern 45 are removed by means of lift-off method. As shown in FIG. 27, a pair of bias layers 27a and 27b are now embedded in the soft-magnetic film 44.

Figure 28:
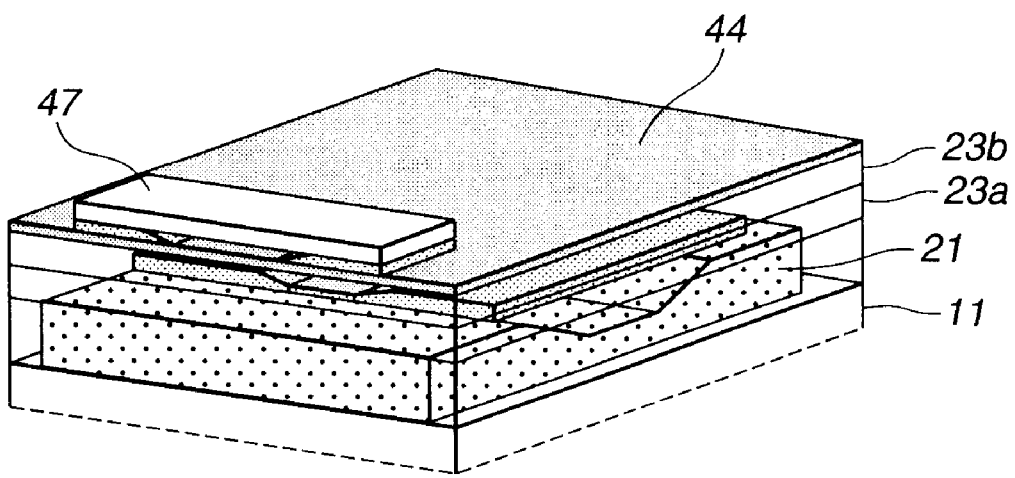
FIG. 28 is a perspective view explaining the method of manufacturing the MR head of the invention, showing a photo resist pattern formed on the bias layers and that part of the soft-magnetic film on which the flux-guiding element will be provided.

As shown in FIG. 28, a photo resist pattern 47 is formed, by photolithography, on the bias layers 27a and 27b, bridging these layers 27a and 27b, and above the soft-magnetic film 44. The photo resist pattern 47 lies above the position where the flux-guiding element 24 will be formed. Using the pattern 47 as mask, ion etching is performed. The soft-magnetic film 44 is thereby removed, except that part which will be the flux-guiding element 24. Thus, the flux-guiding element 24 is provided, which is connected to the pair of bias layers 27a and 27b.

Figure 29:
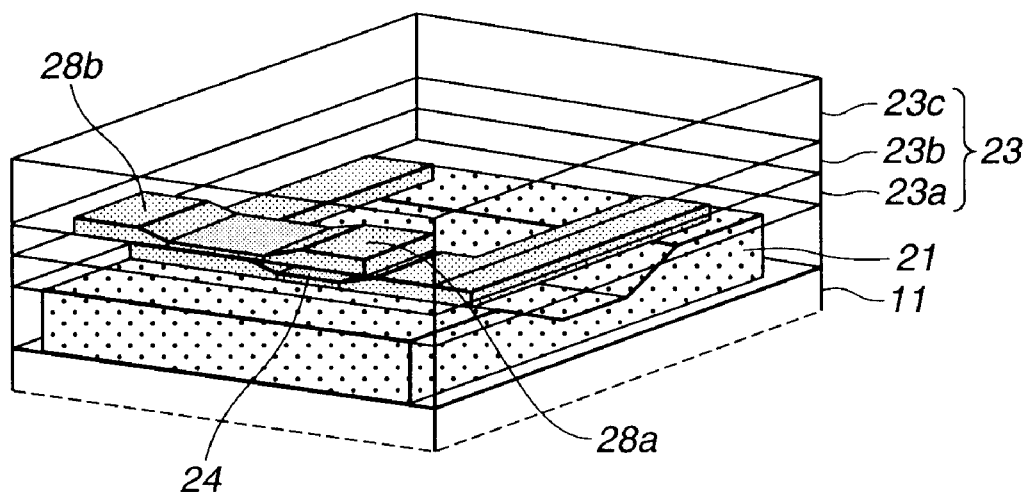
FIG. 29 is a perspective view explaining the method of manufacturing the MR head of the invention, illustrating a third gap layer formed on the second gap layer on which the flux-guiding element is mounted and connected to the bias layers.

After the flux-guiding element 24 connected to the bias layers 27a and 27b has been formed on the second gap film 23b, a non-magnetic, non-conductive film made of $Al_2O_3$ or the like is formed on the second gap film 23b by sputtering or the like to a prescribed thickness. This film is polished by chemical polishing or the like, until its part lying on the flux-guiding element 24 becomes thinner to about 135 nm. As a result, the third gap film 23c is formed on the second gap film 23b, covering the flux-guiding element 24 as is illustrated in FIG. 29.

Figure 30:
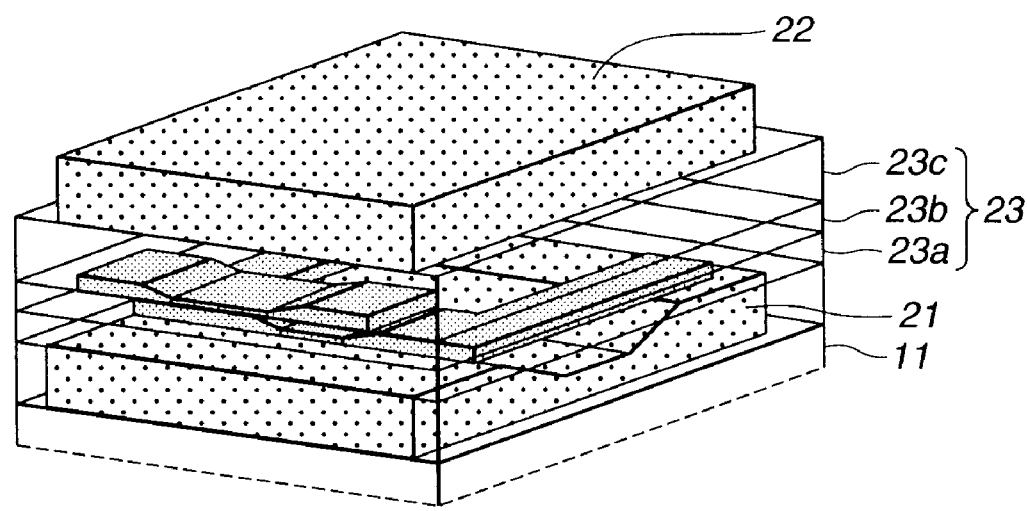
FIG. 30 is a perspective view explaining the method of manufacturing the MR head of the invention, showing an upper magnetic shield layer provided on the third gap film.

A soft-magnetic film of Ni-Fe alloy, amorphous material such as ZrNbTa, Fe—Si—Al alloy or the like is formed on the third gap film 23c having a flat upper surface, by means of sputtering, plating or the like to a thickness of about 3 $\mu$m. This soft-magnetic film is subjected to photolithography and ion etching, acquiring a specific shape. Thus, the upper magnetic shield layer 22 is formed on the third gap film 23c as is illustrated in FIG. 30.

Next, terminals 29a and 29b made of electrically conductive material are formed by plating or the like, on the other end of the bias/electrode layer 28a and the other end of the bias/elect-ode layer 28b, respectively. Thereafter, the second substrate 12 is bonded to the upper magnetic shield layer 22 with an adhesive or the like. Cylindrical grinding is performed on the upper edges of the first and second substrates 11 and 12, forming the medium-facing surface 10a and shaping the entire structure like a chip. Thus, the MR head 10 of the type shown in FIGS. 4 and 6 is manufactured.

Described above is the method of manufacturing the MR head 10 that has a GMR element of spin-valve structure, or an MR element 25. The MR element 25 may be replaced by a TMR element. If this is the case, a sense current flows, perpendicular to the TMR element that is a film. Hence, the MR head 10 is manufactured in a method somewhat different from the above-described method of manufacturing the MR head 10 having a GMR element.

A method of manufacturing an MR head 10 having an TMR element used as the MR element 25 will be described, illustrating only the steps that differ from those of the method of manufacturing the MR head 10 having a GMR element of spin-valve structure.

To manufacture an MR head 10 having a TMR element for an MR element 25, almost the same steps are performed as in the method of manufacturing the MR head 10 having the GMR element of spin-value structure, until the MR element 25 is provided on the first gap film 23a. However, the first gap film 23a is made of non-magnetic, electrically conductive material such as Ta, to function as lower electrode. The MR element 25 is a TMR element, not a GMR element of spin-value structure. The uppermost layer of the TMR element is a free layer, which lies more close to the flux-guiding element 24 than any other constituent layers of the TMR element. Further, an insulating bias layer of, for example, Co-$\gamma Fe_2O_3$ or the like is provided, in place of a pair of bias/electrode layers 28a and 28b.

Figure 31:
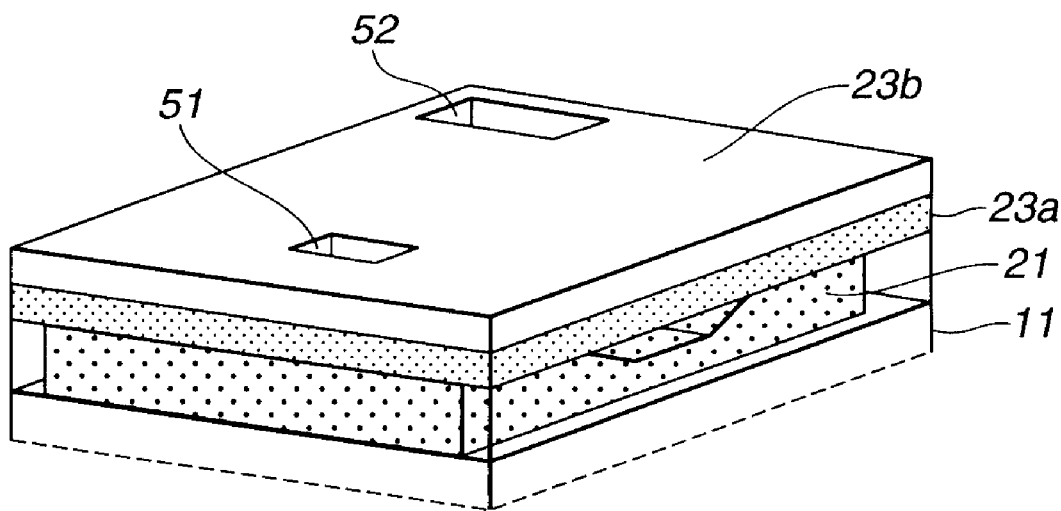
FIG. 31 is a perspective view explaining another method of manufacturing an MR head of the invention, showing contact holes made in the second gap film.

After the MR element 25 has been formed on the first gap film 23a, a second gap film 23b is formed on the first gap film 23a. The second gap film 23b is made of non-magnetic, non-conductive material, such as $Al_2O_3$. A part of the second gap film 23b, which lies above the MR element 25, and another part of the film 23b, which is spaced apart by a prescribed distance from the medium-facing surface 10a, are removed by lift-off method or a similar method. Two contact holes 51 and 52 are thereby made in the second gap film 23b as is shown in FIG. 31. The first contact hole 51 exposes the MR element 25. The second contact hole 52 exposes the first contact film 23a.

Figure 32:
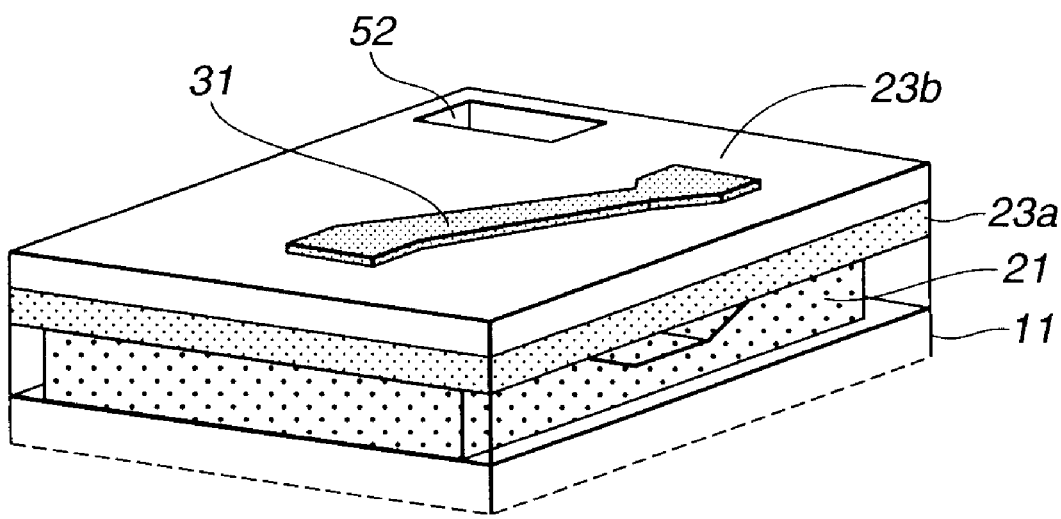
FIG. 32 is a perspective view explaining another method of manufacturing an MR head of the invention, illustrating the upper electrode provided on the second gap film.
Figure 33:
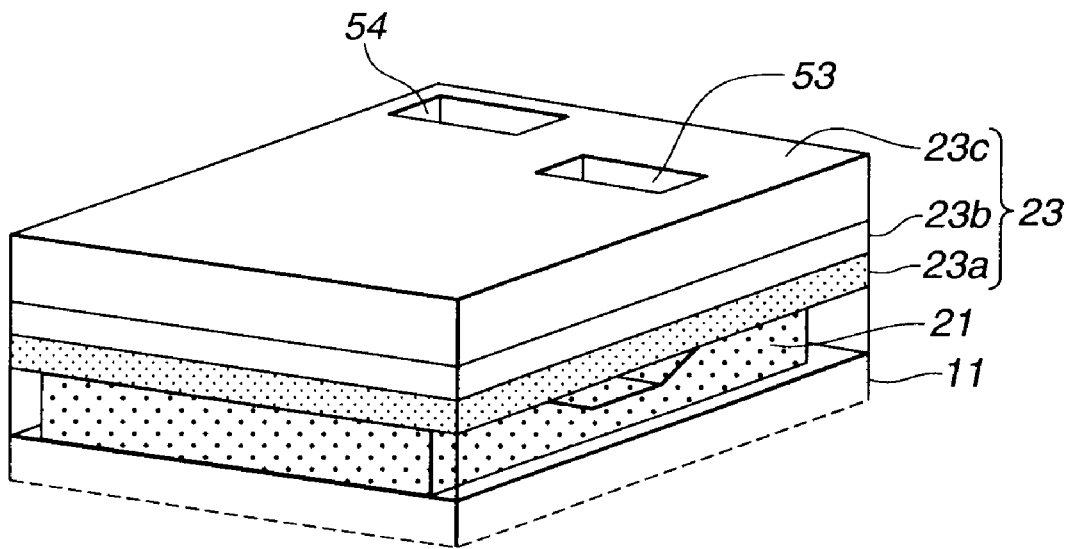
FIG. 33 is a perspective view for describing another method of manufacturing an MR head, according to the present invention, illustrating the contact holes made in the third gap film.

As FIG. 32 illustrates, an upper electrode 31 made of conductive material such as Cu is formed on the second gap film 23b. The upper electrode 31 has one end extending through the contact hole 51 and connected to the upper surface of the MR element 25. The other end of the upper electrode 31 lies, spaced away from the medium-facing surface 10a.

A flux-guiding element 24 is formed on the second gap film 23b on which the upper electrode 31 is now provided, in the same manner as in the method of manufacturing the MR head 10 of FIGS. 5 and 6. The flux-guiding element 24 is connected to bias layers 27a and 27b. A third gap film 23c made of non-magnetic, non-conductive material such as $Al_2O_3$ is formed on the second gap film 23b. Two parts of the third gap film 23c, which lie on the other end of the upper electrode 31 and at the contact hole 52, respectively, are removed. Two contact holes 53 and 54 are thereby made in the third gap film 23c. The contact hole 53 exposes the upper electrode 31, and the contact hole 54 exposes the first gap film 23a.

Figure 34:
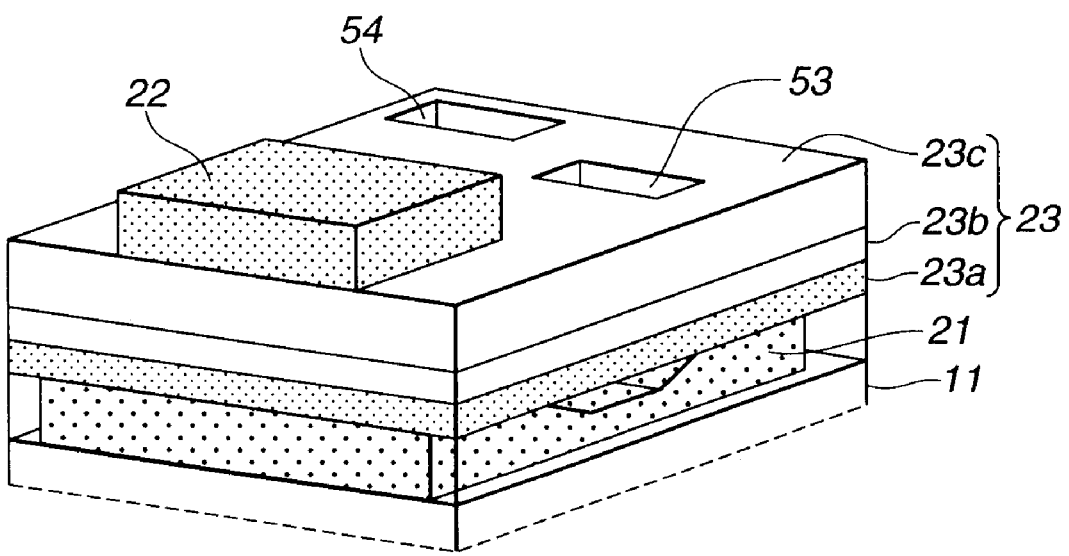
FIG. 34 is a perspective view explaining another method of manufacturing an MR head, according to the present invention, showing the upper magnetic shield layer provided on the third gap film.

A soft-magnetic film of Ni-Fe alloy, amorphous material such as ZrNbTa, Fe-Si-Al alloy or the like is formed on the third gap film 23c having a flat upper surface. This soft-magnetic film is subjected to photolithography and ion etching, acquiring a specific shape. Thus, an upper magnetic shield layer 22 is formed on the third gap film 23c as is illustrated in FIG. 34.

Figure 35:
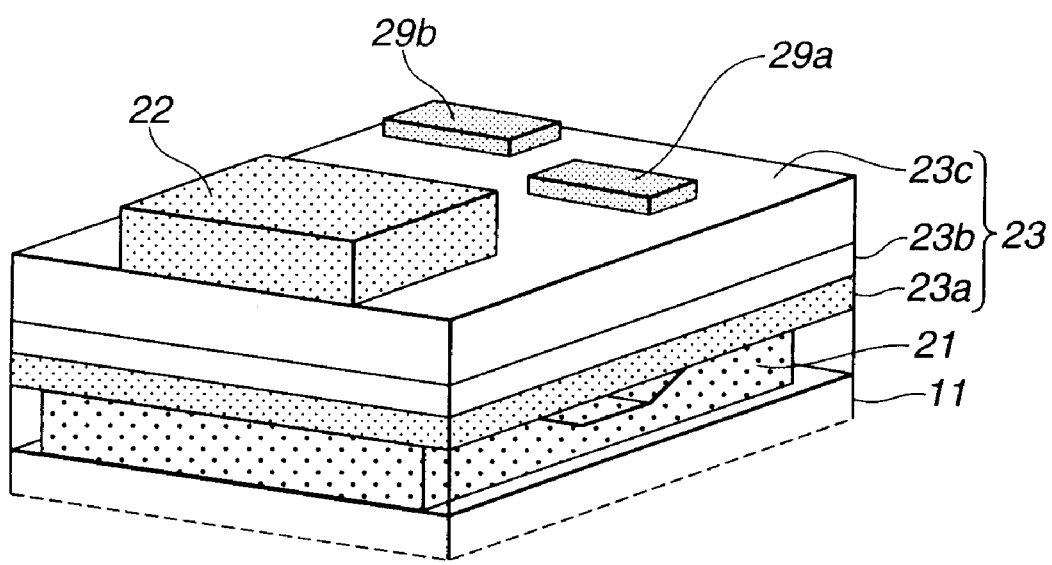
FIG. 35 is a perspective view explaining another method of manufacturing an MR head, according to the present invention, showing a pair of terminals that are formed on the third gap film.

As shown in FIG. 35, terminals 29a and 29b made of conductive material are formed by plating or the like, in the contact holes 53 and 54 made in the third gap film 23c. The terminal 29a extends through the contact hole 54 and is connected to the other end of the upper electrode 31. The terminal 29b extends through the contact holes 54 and 52 and is connected to the first gap film 23a that serves as lower electrode.

Thereafter, a second substrate 12 is bonded to the upper magnetic shield layer 22 with an adhesive or the like. Cylindrical grinding is performed on the upper edges of the first and second substrates 11 and 12, forming the medium-facing surface 10a and shaping the entire structure like a chip. Thus, an MR head 10 is manufactured, which has the MR element 25 that is a TMR element.

What is claimed is:

1. A magnetoresistance-effect magnetic head having a medium-facing surface and comprising an upper magnetic shield layer, a lower magnetic shield layer, an inter-shield gap provided between the upper and lower magnetic shield layers, a magnetoresistance-effect element provided in the inter-shield gap and not exposed at the medium-facing surface, and a flux-guiding element having one end exposed at the medium-facing surface and configured to guide an external magnetic field to the magnetoresistance-effect element, wherein the magnetoresistance-effect element is arranged at a different level from the flux-guiding element, an electrically insulating film is interposed between the magnetoresistance-effect element and the flux-guiding element, a portion of the magnetoresistance-effect element which lies close to the medium-facing surface overlaps a portion of the flux-guiding element which lies remote from the medium-facing surface, and the magnetoresistance-effect element overlaps the flux-guiding element for a distance that falls within a range of 15 to 25% of the length of the magnetoresistance-effect element as measured in a direction perpendicular to the medium-facing surface, and wherein, at least one of the magnetic shield layers, which lies close to the magnetoresistance-effect element has a groove aligned with the magnetoresistance-effect element and the groove is filled with non-magnetic, electrically conductive material.

2. The magnetoresistance-effect magnetic head according to claim 1, further comprising another flux-guiding element that has one part lying close to the medium-facing surface and overlaps the portion of the magnetoresistance-effect element which lies remote from the medium-facing surface, with the electrically insulating film interposed between the other flux-guiding element and the magnetoresistance-effect element.

3. The magnetoresistance-effect magnetic head according to claim 1, wherein the magnetoresistance-effect element is a giant magneto-resistive element of spin-value structure.

4. The magnetoresistance-effect magnetic head according to claim 3, wherein the giant magneto-resistive element of spin-value structure is a laminated layer including a magnetization-free layer provided at the flux-guiding element.

5. The magnetoresistance-effect magnetic head according to claim 1, wherein the magnetoresistance-effect element is a tunneling magneto-resistive element that achieves a ferromagnetic tunneling magnetoresistance effect.

6. The magnetoresistance-effect magnetic head according to claim 5, wherein the tunneling magneto-resistive element is a laminated layer including a magnetization-free layer provided at the flux-guiding element.

7. The magnetoresistance-effect magnetic head according to claim 1, further comprising:

bias/electrode layers configured to apply a bias magnetic field to the magnetoresistance-effect element in a track-width direction and to supply a sense current to the magnetoresistance-effect element; and bias layers configured to apply a bias magnetic field to the magnetoresistance-effect element and a bias magnetic field to the flux-guiding element in the same direction the bias magnetic field is applied to the magnetoresistance-effect element.

8. A magnetoresistance-effect magnetic head having a medium-facing surface and comprising:

upper and lower magnetic shield layers;

an inter-shield gap provided between the upper and lower magnetic shield layers;

a magnetoresistance-effect element located in the inter-shield gap, wherein the magnetoresistance-effect element is not exposed to the medium-facing surface; and a flux-guiding element having one end exposed at the medium-facing surface and configured to guide an external magnetic field to the magnetoresistance-effect element, wherein the magnetoresistance-effect element is arranged at a different level from the flux-guiding element, a portion of the magnetoresistance-effect element overlaps a portion of the flux-guiding element, and the magnetic shield layer which lies closest to the magnetoresistance-effect element has a groove aligned with the magnetoresistance-effect element.

9. The magnetoresistance-effect magnetic head according to claim 8 further comprising an electrically insulating film interposed between the magnetoresistance-effect element and the flux-guiding element.

10. The magnetoresistance-effect magnetic head according to claim 8, wherein the groove is filled with non-magnetic, electrically conductive material.

* * * * *